US011996019B2

(12) United States Patent
Lee et al.

(10) Patent No.: US 11,996,019 B2
(45) Date of Patent: May 28, 2024

(54) DISPLAY DEVICE AND DRIVING METHOD THEREOF

(71) Applicant: Samsung Display Co., Ltd., Yongin-si (KR)

(72) Inventors: Jun Gyu Lee, Yongin-si (KR); Byung Ki Chun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/932,454

(22) Filed: Jul. 17, 2020

(65) Prior Publication Data

US 2021/0134199 A1 May 6, 2021

(30) Foreign Application Priority Data

Nov. 4, 2019 (KR) ........................ 10-2019-0139556

(51) Int. Cl.
*G09G 3/00* (2006.01)
*G09G 3/20* (2006.01)

(52) U.S. Cl.
CPC ............... *G09G 3/007* (2013.01); *G09G 3/20* (2013.01); *G09G 2320/0257* (2013.01); *G09G 2320/046* (2013.01); *G09G 2340/045* (2013.01); *G09G 2340/0464* (2013.01); *G09G 2340/0492* (2013.01)

(58) Field of Classification Search
CPC .. G09G 3/007; G09G 3/20; G09G 2320/0257; G09G 2340/045; G09G 2320/046; G09G 2340/0464; G09G 2340/0492
See application file for complete search history.

(56) References Cited

U.S. PATENT DOCUMENTS

| | | | | |
|---|---|---|---|---|
| 6,552,705 B1 * | 4/2003 | Hirota | G09G 3/3688 | 345/94 |
| 9,343,015 B2 | 5/2016 | Jo | | |
| 2006/0066555 A1 * | 3/2006 | Miyagawa | G09G 3/2007 | 345/100 |

(Continued)

FOREIGN PATENT DOCUMENTS

| | | |
|---|---|---|
| EP | 1503360 A2 | 2/2005 |
| JP | 2020-38340 A | 3/2020 |

(Continued)

*Primary Examiner* — Matthew A Eason
*Assistant Examiner* — Sujit Shah
(74) *Attorney, Agent, or Firm* — Lewis Roca Rothgerber Christie LLP

(57) ABSTRACT

A display device includes: a plurality of first pixels connected to a first scan line; a plurality of second pixels connected to a second scan line; and a plurality of third pixels connected to a third scan line, wherein, from a position in a first frame period, an image portion displayed by the first pixels, the second pixels, and the third pixels, which are connected to first data lines, is shifted in a first direction, in a second frame period next to the first frame period, wherein an image portion displayed by the first pixels and the second pixels, which are connected to second data lines, is shifted in the first direction, in the second frame period, wherein an image portion displayed by the third pixels connected to the second data lines is shifted in a direction different from the first direction, in the second frame period.

11 Claims, 30 Drawing Sheets

(56) References Cited

U.S. PATENT DOCUMENTS

| | | | | |
|---|---|---|---|---|
| 2007/0096767 | A1* | 5/2007 | Tsai | G09G 3/007<br>324/760.01 |
| 2007/0109284 | A1* | 5/2007 | Yamazaki | G09G 3/3225<br>345/204 |
| 2011/0095974 | A1* | 4/2011 | Moriwaki | G09G 3/3208<br>345/156 |
| 2012/0206467 | A1* | 8/2012 | Shih | G09G 3/344<br>345/545 |
| 2014/0049566 | A1* | 2/2014 | Sudou | G09G 3/20<br>345/681 |
| 2016/0203754 | A1* | 7/2016 | Lee | G09G 3/2092<br>345/214 |
| 2016/0217770 | A1 | 7/2016 | Kang et al. | |
| 2017/0213493 | A1* | 7/2017 | Han | G09G 3/3208 |
| 2017/0221455 | A1* | 8/2017 | Lee | G09G 3/3233 |
| 2018/0012530 | A1 | 1/2018 | Lee et al. | |
| 2018/0012563 | A1 | 1/2018 | Lee et al. | |
| 2018/0286356 | A1* | 10/2018 | Jiang | G09G 5/36 |
| 2019/0096303 | A1* | 3/2019 | Masuda | H04N 9/3111 |
| 2019/0156726 | A1 | 5/2019 | Chun | |
| 2020/0074906 | A1 | 3/2020 | Lee et al. | |
| 2020/0218204 | A1* | 7/2020 | Koh | G04G 9/04 |

FOREIGN PATENT DOCUMENTS

| | | | |
|---|---|---|---|
| KR | 10-2015-0012022 | A | 2/2015 |
| KR | 10-2018-0006584 | A | 1/2018 |
| KR | 10-2018-0006586 | A | 1/2018 |
| KR | 10-2019-0058124 | A | 5/2019 |

* cited by examiner

DISPLAY DEVICE AND DRIVING METHOD THEREOF

CROSS-REFERENCE TO RELATED APPLICATION

This application claims priority to and the benefit of Korean patent application No. 10-2019-0139556 filed on Nov. 4, 2019 in the Korean Intellectual Property Office, the entire disclosure of which is incorporated herein by reference.

BACKGROUND

1. Field

Aspects of some example embodiments of the present disclosure generally relate to a display device and a driving method thereof.

2. Related Art

With the development of information technologies, the use of display devices, which provide a connection medium between user and information, has increased. Accordingly, display devices such as liquid crystal display devices, organic light emitting display devices, and plasma display devices are increasingly being utilized.

When a display device continuously displays a still or static image, a temporary afterimage may be generated by hysteresis characteristics of transistors included in pixel circuits, or a permanent afterimage may be generated due to degradation of light emitting diodes included in the pixels.

Also, even when the display device displays a moving image, an afterimage may be generated when there is an area at which an image (e.g., a logo) having a fixed character, figure, picture, color, etc. is displayed.

The above information disclosed in this Background section is only for enhancement of understanding of the background and therefore the information discussed in this Background section does not necessarily constitute prior art.

SUMMARY

Some example embodiments relate to a pixel shift technique for displaying an image while shifting the image in a range where the shift of the image is not perceived by users.

Aspects of some example embodiments include a display device capable of enhancing a pixel shift effect by partially increasing a shift amount of a target image area, and a driving method of the display device.

According to some example embodiments of the present disclosure, there is provided a display device including: first pixels connected to a first scan line; second pixels connected to a second scan line; and third pixels connected to a third scan line, wherein, from a position in a first frame period, an image portion displayed by the first pixels, the second pixels, and the third pixels, which are connected to first data lines, is shifted in a first direction, in a second frame period next to the first frame period, wherein an image portion displayed by the first pixels and the second pixels, which are connected to second data lines, is shifted in the first direction, in the second frame period, wherein an image portion displayed by the third pixels connected to the second data lines is shifted in a direction different from the first direction, in the second frame period.

According to some example embodiments, the display device may further include fourth pixels connected to a fourth scan line. An image portion displayed by the fourth pixels connected to third data lines and fourth data lines may be shifted in a direction different from the first direction, in the second frame period, and an image portion displayed by the third pixels connected to the third data lines and the fourth data lines may be shifted in the first direction, in the second frame period. The third data lines may be located between some of the first data lines and the second data lines, and the fourth data lines may be located between the second data lines and the others of the first data lines.

According to some example embodiments, an image portion displayed by the fourth pixels connected to the first data lines may be shifted in the first direction, in the second frame period.

According to some example embodiments, the display device may further include fifth pixels connected to a fifth scan line. An image portion displayed by the fifth pixels connected to the second data lines may be shifted in a direction different from the first direction, in the second frame period, and an image portion displayed by the fifth pixels connected to the first data lines, the third data lines, and the fourth data lines may be shifted in the first direction, in the second frame period.

According to some example embodiments, the display device may further include fifth pixels connected to a fifth scan line. An image portion displayed by the fifth pixels connected to the second data lines may be shifted in the first direction, in the second frame period.

According to some example embodiments, an image portion displayed by the third pixels, the fourth pixels, and the fifth pixels, which are connected to the second data lines, and the fourth pixels connected to the third and fourth data lines may be a logo.

According to some example embodiments, the logo may be periodically shifted with a first cycle, and an image portion displayed by the first pixels and the second pixels may be periodically shifted with a second cycle. The first cycle and the second cycle may be different from each other.

According to some example embodiments, the logo may be alternately shifted clockwise and counterclockwise.

According to some example embodiments, an edge of the logo may be shifted in the first direction, in the second frame period, and a portion of an internal area of the logo may be shifted in a direction different from the first direction, in the second frame period.

According to some example embodiments of the present disclosure, there is provided a method for driving a display device, the method including: displaying an image in a first image area and a second image area surrounded by the first image area in a first frame period; and shifting the first image area in a first direction and shifting the second image area in a direction different from the first direction in a second frame period next to the first frame period, wherein the second image area has an edge extending in a direction different from the first direction and a second direction perpendicular to the first direction.

According to some example embodiments, the edge may be provided in one of an elliptical shape and a circular shape.

According to some example embodiments, a position of the edge in the first frame period and a position of the edge in the second frame period may be different from each other.

According to some example embodiments, the position of the edge in the second frame period may be located in the first direction from the position of the edge in the first frame period.

According to some example embodiments, a portion of an internal area of the second image area may be shifted in a direction opposite to the first direction, in the second frame period.

According to some example embodiments, a portion of an internal area of the second image area may be shifted clockwise or counterclockwise, in the second frame period.

According to some example embodiments of the present disclosure, there is provided a method for driving a display device, the method including: enlarging an image to have grayscale values of which number is greater than that of all pixels; rotating a first image area of the enlarged image clockwise and displaying the rotated first image area, in a first frame period; and rotating the first image area counter-clockwise and displaying the rotated first image area, in a second frame period next to the first frame period.

According to some example embodiments, in the first frame period and the second frame period, a rotation angle of the image may be limited to a range where all the pixels display a portion of the rotated image.

According to some example embodiments, in the first frame period and the second frame period, pixels located at corners among all the pixels display a portion of the rotated image.

According to some example embodiments, the method may further include shifting a second image area surrounded by the first image area in a first direction, in the first frame period or the second frame period. The first direction may be a direction different from the clockwise direction and the counterclockwise direction.

According to some example embodiments, in the first frame period and the second frame period, a rotation angle of the first image area may become greater as farther from a boundary of the first image area and the second image area.

BRIEF DESCRIPTION OF THE DRAWINGS

Aspects of some example embodiments will now be described more fully hereinafter with reference to the accompanying drawings; however, they may be embodied in different forms and should not be construed as limited to the example embodiments set forth herein. Rather, these example embodiments are provided so that this disclosure will be more thorough and more complete, and will more fully convey the scope and characteristics of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
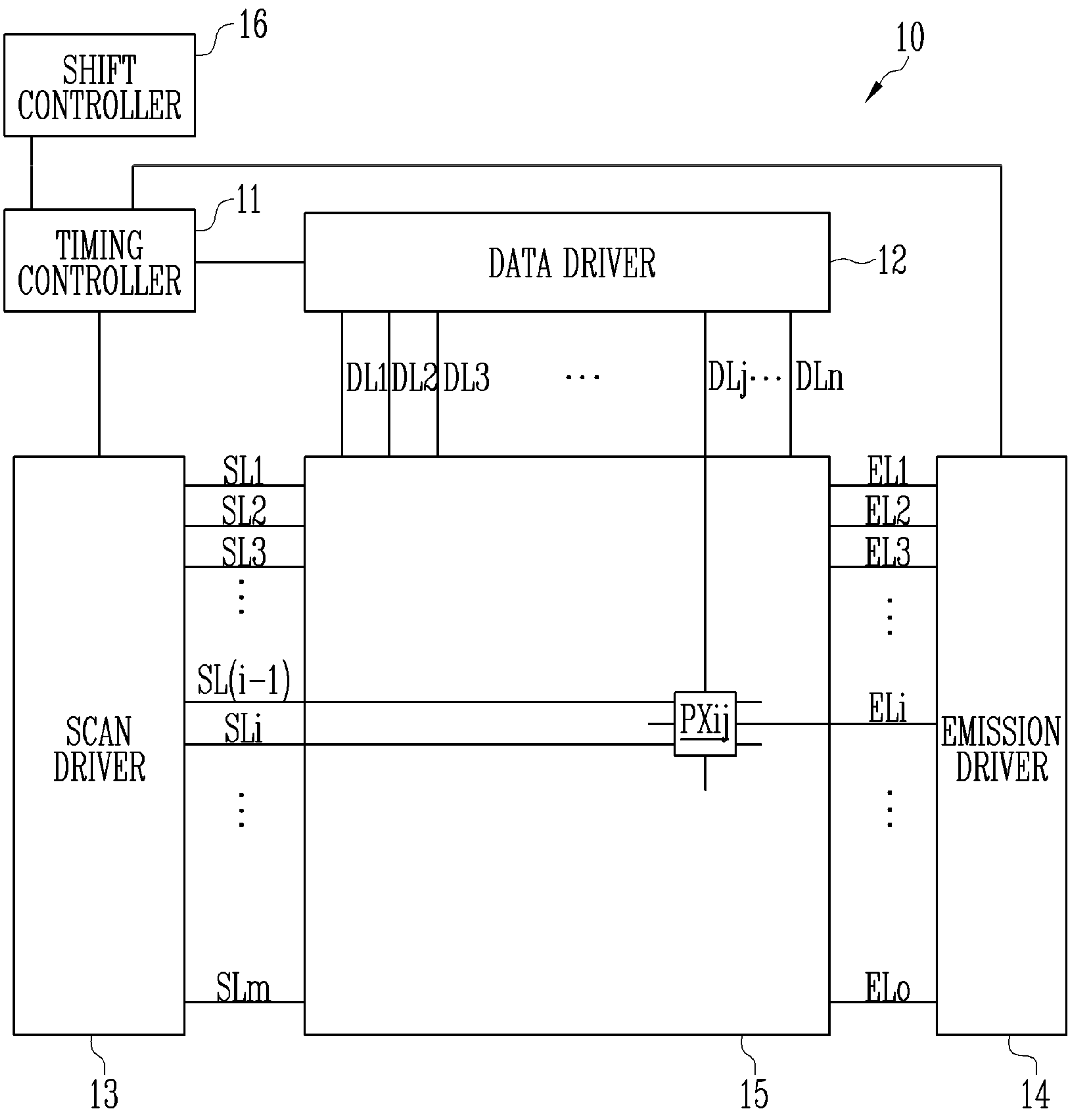
FIG. 1 is a diagram illustrating a display device according to some example embodiments of the present disclosure.

Hereinafter, aspects of some example embodiments are described in more detail with reference to the accompanying drawings so that those skilled in the art may practice embodiments according to the present disclosure. Embodiments according to the present disclosure may be implemented in various different forms and are not limited to the example embodiments described in the present specification.

Descriptions of certain elements, components, or features that may not be relevant to enabling a person having ordinary skill in the art to make and use the invention may be omitted to more clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

FIG. 1 is a diagram illustrating a display device according to some example embodiments of the present disclosure.

Referring to FIG. 1, the display device 10 according to some example embodiments of the present disclosure may include a timing controller 11, a data driver 12, a scan driver 13, an emission driver 14, a pixel unit 15, and a shift controller 16.

The timing controller 11 may receive grayscale values and control signals for each image frame from an external processor or an external source. The timing controller 11 may provide control signals suitable for specifications respectively to the data driver 12, the scan driver 13, the emission driver 14, and the like so as to display an image corresponding to an image frame.

The timing controller 11 may render the grayscale values to correspond to specifications of the pixel unit 15. For example, the external processor may provide a red grayscale value, a green grayscale value, and a blue grayscale value for each unit dot (or sub-pixel). However, for example, when the pixel unit 14 has a Pentile structure, adjacent unit dots share a pixel, and therefore, pixels may not correspond one-to-one to the respective grayscale values. Accordingly, the grayscale values may be rendered or generated. When the pixels correspond one-to-one to the respective grayscale values, it may be unnecessary to render the grayscale values. An image generated or displayed according to the grayscale values provided by the timing controller 11 may be referred to as a first image.

The shift controller 16 may receive the first image, generate a second image by shifting the first image in a first direction, and generate a third image by shifting the second image in a direction, for example, a second direction different from the first direction. The first direction and the second direction may be directions orthogonal to each other. The meaning of shifting in the first direction may include the meaning of shifting in a direction opposite to the first direction. Similarly, the meaning of shifting in the second direction may include the meaning of shifting in a direction opposite to the second direction. In some cases, the third image may be generated by shifting the first image in only one of the first direction and the second direction.

The shift controller 16 may be configured with the same integrated chip (IC) as the timing controller 11. For example, the shift controller 16 may be partial hardware or partial software of the timing controller 11. That is, according to some example embodiments, the shift controller 16 may be implemented as part of a component integrated with the timing controller 11, and the functionality of the shift controller 16 may be executed using any suitable combination of hardware (e.g., circuit) components and software, according to the design of the shift controller 16 and the timing controller 11. According to some example embodiments, the shift controller 16 may be configured with the same IC as the data driver. For example, the shift controller 16 may be partial hardware or partial software of the data driver 12. That is, according to some example embodiments, the shift controller 16 may be implemented as part of a component integrated with the data driver 12, and the functionality of the shift controller 16 may be executed using any suitable combination of hardware (e.g., circuit) components and software, according to the design of the shift controller 16 and the data driver 12.

The data driver 12 may generate data voltages to be provided to data lines DL1, DL2, DL3, . . . , DLj, . . . , and DLn by using grayscale values of the third image and control signals. For example, the data driver 12 may sample the grayscale values by using a clock signal, and apply data voltages corresponding to the grayscale values to the data lines DL1 to DLn in a unit of a pixel row (e.g., pixels connected to the same scan line). Here, j and n may be integers greater than 0.

The scan driver 13 may generate scan signals to be provided to scan lines SL1, SL2, SL3, . . . , SL(i-1), SLi, . . . , and SLm by receiving a clock signal, a scan start signal, and the like from the timing controller 11. Here, i and m may be integers greater than 0.

The scan driver 13 may sequentially supply scan signals having a pulse of a turn-on level to the scan lines SL1 to SLm. The scan driver 13 may include scan stages configured in the form of shift registers. The scan driver 13 may generate scan signals in a manner that sequentially transfers the scan start signals in the form of a pulse of a turn-on level to a next scan stage under the control of the clock signal.

The emission driver 14 may generate emission signals to be provided to emission lines (EL1, EL2, EL3, . . . , ELi, . . . , and ELo) by receiving a clock signal, an emission stop signal, and the like. Here, o may be an integer greater than 0. For example, the emission driver 14 may sequentially provide emission signals having a pulse of a turn-off level to the emission lines EL1 to ELo. For example, emission stages of the emission driver 14 may be configured in the form of shift registers. The emission driver 14 may generate emission signals in a manner that sequentially transfers the emission stop signal in the form of a pulse of a turn-off level to a next emission stage under the control of the clock signal. According to some example embodiments, the emission driver 14 may be omitted according to a circuit configuration of a pixel PXij.

The pixel unit 15 may include a plurality of pixels. Each of the pixels may be connected to a corresponding data line, a corresponding scan line, and a corresponding emission line. For example, a scan input terminal of the pixel PXij may be connected to an ith scan line SLi, and a data input terminal of the pixel PXij may be connected to a jth data line DLj.

Figure 2:
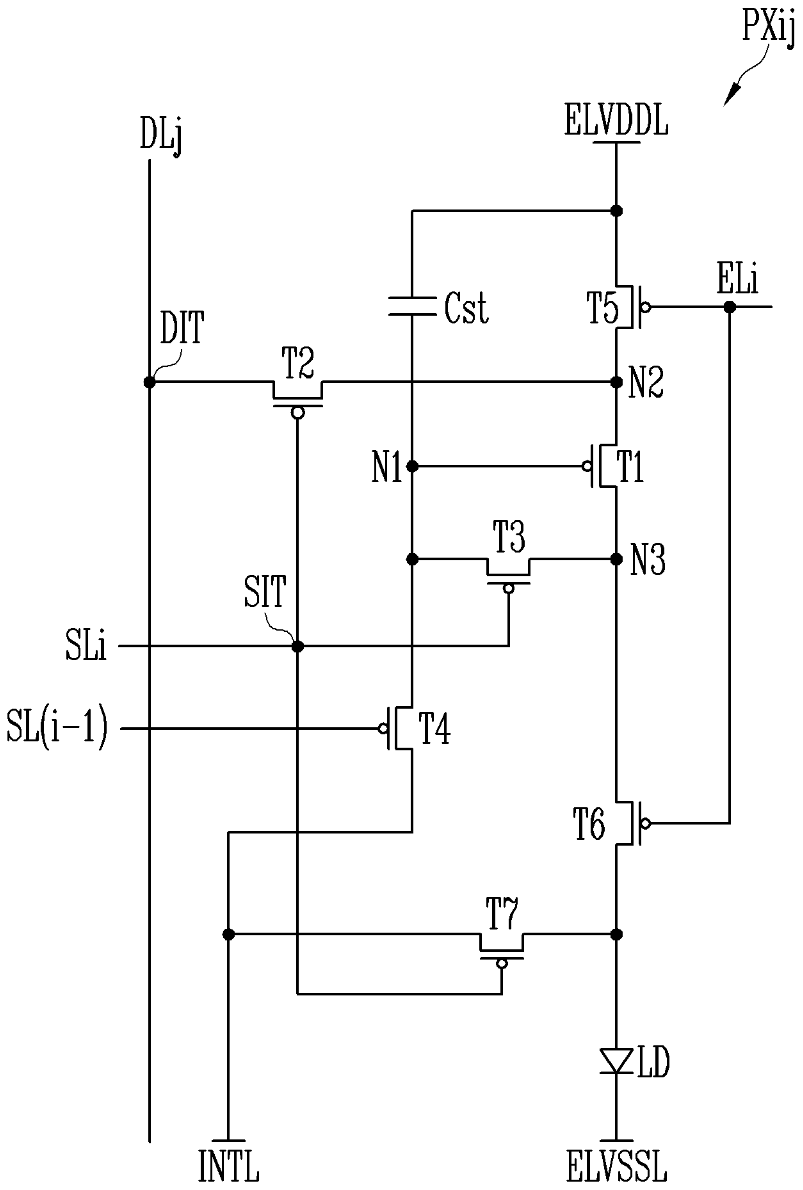
FIG. 2 is a diagram illustrating a pixel according to some example embodiments of the present disclosure.

FIG. 2 is a diagram illustrating a pixel according to some example embodiments of the present disclosure.

Referring to FIG. 2, the pixel PXij may include transistors T1, T2, T3, T4, T5, T6, and T7, a storage capacitor Cst, and a light emitting diode LD.

Hereinafter, a circuit implemented with a P-type transistor is described as an example. However, those skilled in the art may design a circuit implemented with an N-type transistor by changing the polarity of a voltage applied to a gate terminal. Similarly, those skilled in the art may design a circuit implemented with a combination of the P-type transistor and the N-type transistor. The P-type transistor refers to a transistor in which an amount of current flowing when the difference in voltage between a gate electrode and a source electrode increases in a negative direction increases. The N-type transistor refers to a transistor in which an amount of current flowing when the difference in voltage between a gate electrode and a source electrode increases in a positive direction increases. The transistor may be configured in various forms including a Thin Film Transistor (TFT), a Field Effect Transistor (FET), a Bipolar Junction Transistor (BJT), and the like.

A gate electrode of a first transistor T1 may be connected to a first node N1, a first electrode of the first transistor T1 may be connected to a second node N2, and a second electrode of the first transistor T1 may be connected to a third node N3. The first transistor T1 may be referred to as a driving transistor.

A gate electrode of a second transistor T2 may be connected to an i-th scan line SLi, a first electrode of the second transistor T2 may be connected to a data line DLj, and a second electrode of the second transistor T2 may be connected to the second node N2. The second transistor T2 may be referred to as a scan transistor. The first electrode of the second transistor T2 may be a data input terminal DIT of the pixel PXij. In addition, the gate electrode of the second transistor T2 may be a scan input terminal SIT of the pixel PXij.

A gate electrode of a third transistor T3 may be connected to the i-th scan line SLi, a first electrode of the third transistor T3 may be connected to the first node N1, and a second electrode of the third transistor T3 may be connected to the third node N3. The third transistor T3 may be referred to as a diode connection transistor. Thus, as illustrated in FIG. 2, the first transistor T1 may become diode-connected in response to the third transistor T3 being turned on according to the scan signal applied to the i-th scan line SLi.

A gate electrode of a fourth transistor T4 may be connected to an (i-1)th scan line SL(i-1), a first electrode of the fourth transistor T4 may be connected to the first node N1, and a second electrode of the fourth transistor T4 may be connected to an initialization line INTL. According to some example embodiments, the gate electrode of the fourth transistor T4 may be connected to another scan line. The fourth transistor T4 may be referred to as a gate initialization transistor.

A gate electrode of a fifth transistor T5 may be connected to an ith emission line ELi, a first electrode of the fifth transistor T5 may be connected to a first power line ELVDDL, and a second electrode of the fifth transistor T5 may be connected to the second node N2. The fifth transistor T5 may be referred to as an emission transistor. In another embodiment, the gate electrode of the fifth transistor T5 may be connected to another emission line.

A gate electrode of a sixth transistor T6 may be connected to the i-th emission line ELi, a first electrode of the sixth transistor T6 may be connected to the third node N3, and a second electrode of the sixth transistor T6 may be connected to an anode of the light emitting diode LD. The sixth transistor T6 may be referred to as an emission transistor. According to some example embodiments, the gate electrode of the sixth transistor T6 may be connected to another emission line.

A gate electrode of a seventh transistor T7 may be connected to the i-th scan line SLi, a first electrode of the seventh transistor T7 may be connected to the initialization line INTL, and a second electrode of the seventh transistor T7 may be connected to the anode of the light emitting diode LD. The seventh transistor T7 may be referred to as a light emitting diode initialization transistor. According to some example embodiments, the gate electrode of the seventh transistor T7 may be connected to another scan line.

A first electrode of the storage capacitor Cst may be connected to the first power line ELVDDL, and a second electrode of the storage capacitor Cst may be connected to the first node N1.

The anode of the light emitting diode LD may be connected to the second electrode of the sixth transistor T6, and a cathode of the light emitting diode LD may be connected to a second power line ELVSSL. The light emitting diode LD may be configured as an organic light emitting diode, an inorganic light emitting diode, a quantum dot light emitting diode, etc. Degradation of the pixel PXij may mean degradation of the light emitting diode LD.

A first power voltage may be applied to the first power line ELVDDL, a second power voltage may be applied to the second power line ELVSSL, and an initialization voltage may be applied to the initialization line INTL. For example, the first power voltage may be higher than the second power voltage. For example, the initialization voltage may be equal to or higher than the second power voltage. For example, the initialization voltage may correspond to a data voltage having the smallest magnitude among data voltage to be provided. For example, a magnitude of the initialization voltage may be smaller than those of the data voltages to be provided.

Figure 3:
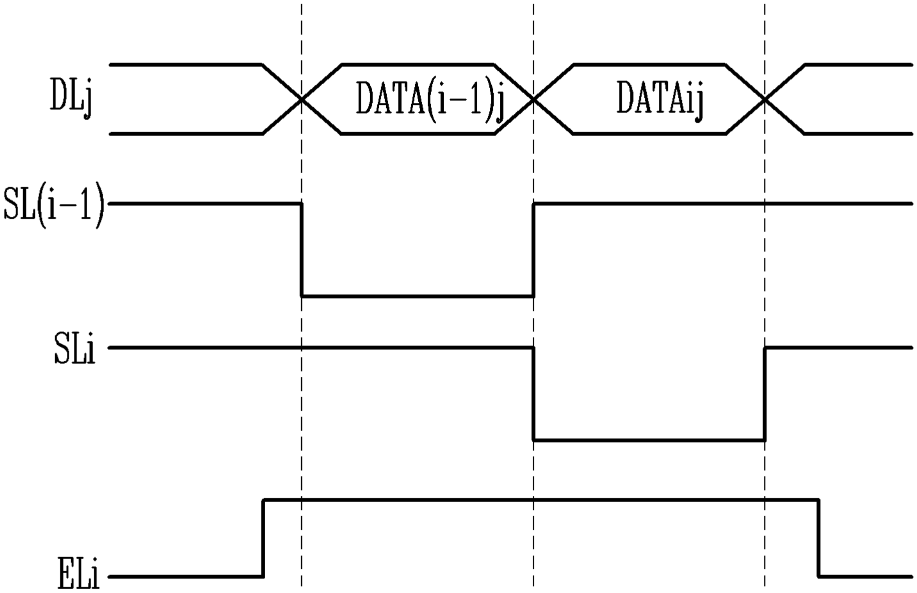
FIG. 3 is a diagram illustrating an example driving method of the pixel shown in FIG. 2.

FIG. 3 is a diagram illustrating an example driving method of the pixel shown in FIG. 2.

First, a data voltage DATA(i-1)j of an (i-1)th pixel is applied to the data line DLj, and a scan signal of a turn-on level (logic low level) is applied to the (i-1)th scan line SL(i-1).

Because a scan signal of a turn-off level (e.g., logic high level) is applied to the ith scan line SLi, the second transistor T2 is in a turn-off state, and the data voltage DATA(i-1)j of the (i-1)th pixel is prevented from being input to the pixel PXij.

Because the fourth transistor T4 is in a turn-on state, the first node N1 is connected to the initialization line INTL, so that a voltage of the first node N1 is initialized. Because an emission signal of a turn-off level is applied to the emission line Eli, the transistors T5 and T6 are in the turn-off state, and the light emitting diode LD is prevented from unnecessarily emitting light in a process of applying the initialization voltage.

Next, a data voltage DATAij of an ith pixel PXij is applied to the data line DLj, and a scan signal of a turn-on level is applied to the ith scan line SLi. Accordingly, the transistors T2, T1, and T3 are in a conduction state, and the data line DLj and the first node N1 are electrically connected to each other. Thus, a compensation voltage obtained by subtracting a threshold voltage of the first transistor T1 from the data voltage DATAij is applied to the second electrode (i.e., the first node N1) of the storage capacitor Cst, and the storage capacitor Cst maintains a voltage corresponding to the difference between the first power voltage and the compensation voltage. Such a period may be referred to as a threshold voltage compensation period.

Because the seventh transistor T7 is in the turn-on state, the anode of the light emitting diode LD and the initialization line INTL are connected to each other, and the light emitting diode LD is initialized to a charge quantity corresponding to the difference between the initialization voltage and the second power voltage.

Subsequently, when an emission signal of a turn-on level is applied to the emission line Eli, the transistors T5 and T6 may be in the conduction state. Therefore, a driving current path is formed along a path of the first power line ELVDDL, the fifth transistor T5, the first transistor T1, the sixth transistor T6, the light emitting diode LD, and the second power line ELVSSL.

An amount of driving current flowing in the first and second electrodes of the first transistor T1 is controlled according to the voltage maintained in the storage capacitor Cst. The light emitting diode LD emits light with a luminance corresponding to the amount of driving current. The light emitting diode LD emits light until before an emission signal of a turn-off level is applied to the emission line ELi.

Figure 4:
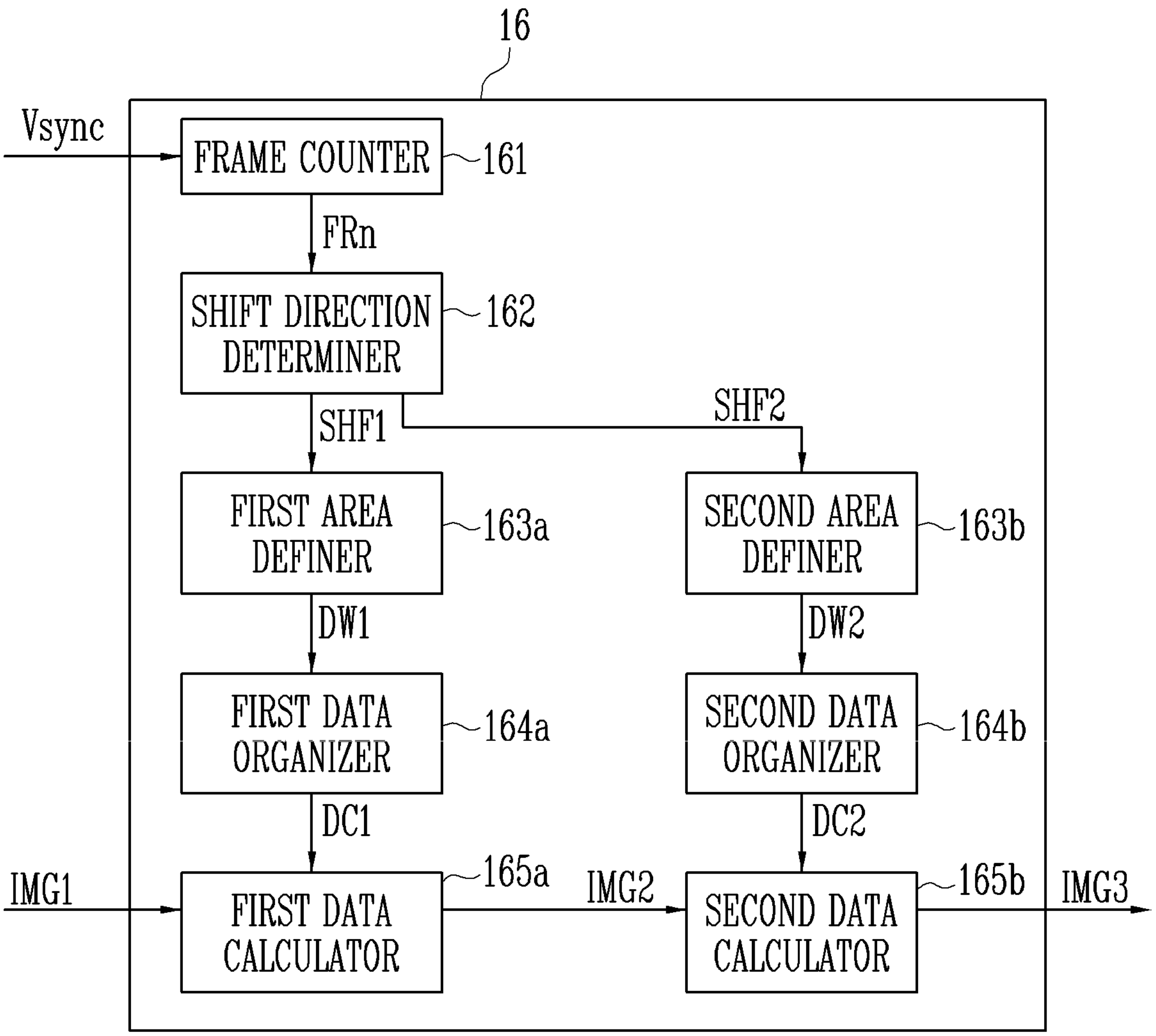
FIG. 4 is a diagram illustrating a shift controller according to some example embodiments of the present disclosure.

FIG. 4 is a diagram illustrating a shift controller according to some example embodiments of the present disclosure.

Referring to FIG. 4, the shift controller 16 according to some example embodiments of the present disclosure may include a frame counter 161, a shift direction determiner 162, a first area definer 163*a*, a first data organizer 164*a*, and a first data calculator 165*a*.

According to some embodiments, the shift controller 16 may further include a second area definer 163*b*, a second data organizer 164*b*, and a second data calculator 165*b*. According to some example embodiments, in which only calculation on one direction is required, the shift controller 16 may not include the second area definer 163*b*, the second data organizer 164*b*, and the second data calculator 165*b*.

The frame counter 161 may check a frame number of a first image IMG1. For example, the frame counter 161 may output a frame number FRn of a target frame, based on a vertical synchronization signal Vsync. The vertical synchronization signal Vsync may be a control signal notifying that supply of data of a previous frame has been ended (end of a previous frame period) and supply of data a current frame has been started (start of a current frame period). For example, the vertical synchronization signal Vsync may has a pulse form, and a period in which pulses of the vertical synchronization signal Vsync are generated may be equal to that of image frames. Thus, the frame counter 161 counts pulses of the vertical synchronization signal Vsync, to check the frame number of the first image IMG1.

The first image IMG1 may include grayscale values corresponding one-to-one to pixels. Therefore, positions of the grayscale values of the first image IMG1 may be described by using positions of the corresponding pixels. Hereinafter, a grayscale row may correspond to a pixel row, and a grayscale column may correspond to a pixel column. As described above, the pixel row may mean pixels connected to the same scan line. The pixel column may mean pixels connected to the same data line.

The shift direction determiner 162 may output a first shift command SHF1 by determining a shift direction and a shift amount of the first image IMG1 with respect to a first direction. The first shift command SHF1 corresponding to the frame number FRn may be pre-stored in a look-up table (LUT) in a scenario form, etc., or be generated in real time through an algorithm.

The shift direction of the first shift command SHF1 may be the first direction or the opposite direction of the first direction. The shift amount of the first shift command SHF1 may be smaller than the width of one pixel. For example, the shift amount may correspond to approximately 1/32 of the width of the pixel. However, for convenience of description, the shift amount may be exaggerated in the following drawings.

Meanwhile, the shift direction determiner 162 may output a second shift command SHF2 by determining a shift direction and a shift amount of the first image IMG1 with respect to a second direction.

The first area definer **163*a* may provide first window definition information DW1 which is information obtained by dividing at least a partial region of the first image IMG1 into a first window area, a second window area, and a third window area, based on the first shift command SHF1**. The second window area may be located in the first direction from the first window area. The third window area may be located between the first window area and the second window area.

The first area definer **163*a* may set the width of the first window area and the width of the second window area to become larger and set the width of the third window area to become smaller, as the shift amount becomes larger. The first area definer 163*a*** may set the width of the first window area and the width of the second window area to become smaller and set the width of the third window area to become larger, as the shift amount becomes smaller.

The first area definer **163*a*** may set the width of the second window area to be larger than the width of the first window area, when the shift direction is the first direction. The first window area may be an up-scaling area (or enlargement area), the second window area may be a down-scaling area (or reduction area), and the third window area may be a non-scaling area (or maintenance area).

The first area definer **163*a*** may set the width of the second window area to be smaller than the width of the first window area, when the shift direction is the opposite direction of the first direction. The first window area may be a down-scaling area, the second window area may be an up-scaling area, and the third window are may be a non-scaling area.

According to some example embodiments, the first area definer **163*a* may set a first window area, a second window area, and a third window area in a unit of a grayscale row. According to some example embodiments, the first area definer 163*a* may set, a plurality of times, the first window area, the second window area, and the third window area on the same grayscale row. The first area definer 163*a* may provide a plurality of first window definition information DW1** in one frame period.

The second area definer **163*b* may provide second window definition information DW2, which is information obtained by dividing at least a partial region of the first image IMG1 into a first window area, a second window area, and a third window area, based on the second shift command SHF2**. The first window area may be located in the second direction from the second window area. The third window area may be located between the first window area and the second window area.

The second area definer **163*b* may set the width of the first window area and the width of the second window area to become larger and set the width of the third window area to become smaller, as the shift amount becomes larger. The second area definer 163*b*** may set the width of the first window area and the width of the second window area to become smaller and set the width of the third window area to become larger, as the shift amount becomes smaller.

The second area definer **163*b*** may set the width of the first window area to be larger than the width of the second window area, when the shift direction is the second direction. The first window area may be a down-scaling area, the second window area may be an up-scaling area, and the third window area may be a non-scaling area.

The second area definer **163*b*** may set the width of the first window area to be smaller than the width of the second window area, when the shift direction is the opposite direction of the second direction. The first window area may be an up-scaling area, the second window area may be a down-scaling area, and the third window are may be a non-scaling area.

According to some example embodiments, the second area definer **163*b* may set a first window area, a second window area, and a third window area in a unit of a grayscale column. According to some example embodiments, the second area definer 163*b*** may set, a plurality of times, the first window area, the second window area, and the third window area on the same grayscale column.

The first data organizer **164*a* may determine or define pixel windows to be included in each of the first window area, the second window area, and the third window area, based on the first window definition information DW1. For example, the first data organizer 164*a*** may determine a number and a width of the pixel windows to be included in each of the first window area, the second window area, and the third window area. Each of the pixel windows may be ratio information on grayscale values at a mapped (overlapped) position.

According to some example embodiments, a width of pixel windows of the up-scaling area, a width of pixel windows of the down-scaling area, and a width of pixel windows of the non-scaling area may be set or predetermined. Therefore, a number of pixel windows to be included in each of the first window area, the second window area, and the third window area may be determined according to the width of the first window area, the width of the second window area, and the width of the third window area, which are included in the first window definition information DW1. Accordingly, the first data organizer **164*a* can provide first data organization information DC1, which is information on pixel windows to be mapped to the first image IMG1**.

According to some example embodiments, the first data organizer **164*a* may receive a plurality of first window definition information DW1 in one frame period. For example, in a case where the first window definition information DW1 is received twice in one frame period, first pixel windows may first be organized based on primarily received first window definition information DW1. Next, second pixel windows may be generated, by re-organizing some pixel windows overlapping with secondarily received first window definition information DW1 among the first pixel windows (by re-adjusting the ratio of grayscale values). Therefore, the first data organizer 164*a* may provide the first data organization information DC1 only once even when the first data organizer 164*a* receives a plurality of first window definition information DW1 in one frame period. Accordingly, the calculation amount of the first data calculator 165*a*** can be minimized or relatively reduced.

The second data organizer **164*b* may determine pixel windows to be included in each of the first window area, the second window area, and the third window area, based on the second window definition information DW2. For example, the second data organizer 164***b* may determine a number and a width of the pixel windows to be included in each of the first window area, the second window area, and the third window area.

According to some example embodiments, a width of pixel windows of the up-scaling area, a width of pixel windows of the down-scaling area, and a width of pixel windows of the non-scaling area may be set or predetermined. Therefore, a number of pixel windows to be included in each of the first window area, the second window area, and the third window area may be determined according to the width of the first window area, the width of the second window area, and the width of the third window area, which are included in the second window definition information DW2. Accordingly, the second data organizer 164*b* can provide first data organization information DC2 which is information on pixel windows to be mapped to the first image IMG1.

According to some example embodiments, the second data organizer 164*b* may receive a plurality of second window definition information DW2 in one frame period. For example, in a case where the second window definition information DW2 is received twice in one frame period, first pixel windows may first or initially be organized based on primarily received second window definition information DW2. Next, second pixel windows may be generated, by re-organizing some pixel windows overlapping with secondarily received second window definition information DW2 among the first pixel windows (by re-adjusting the ratio of grayscale values). Therefore, the second data organizer 164*b* may provide the second data organization information DC2 only once even when the second data organizer 164*b* receives a plurality of second window definition information DW2 in one frame period. Accordingly, the calculation amount of the second data calculator 165*b* can be minimized.

The first data calculator 165*a* may generate grayscale values of a second image IMG2 by performing a calculation by substituting the grayscale values of the first image IMG1 into the first data organization information DC1.

The second data calculator 165*b* may generate grayscale values of a third image IMG3 by performing a calculation by substituting the grayscale values of the second image IMG2 into the second data organization information DC2.

Figure 5:
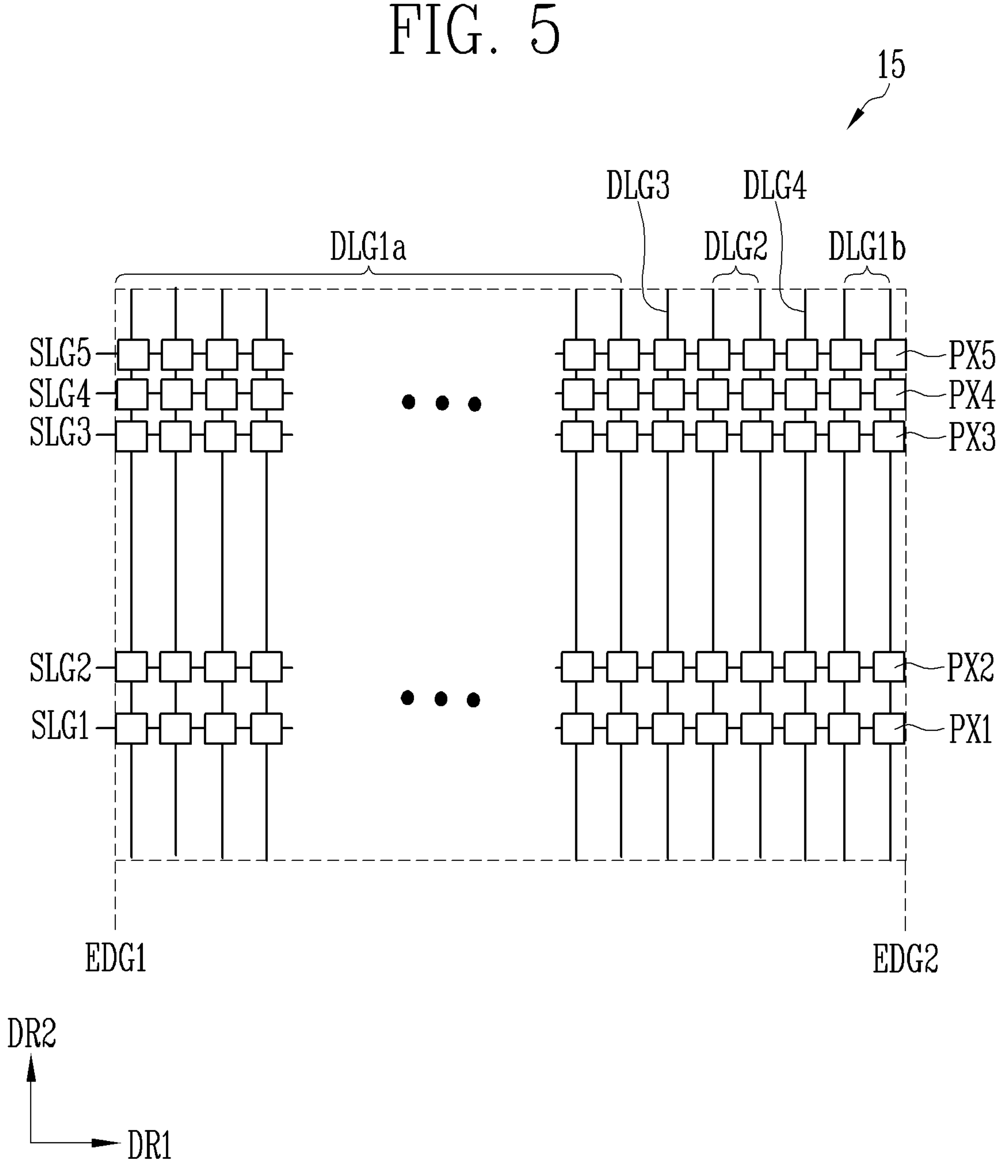
FIG. 5 is a diagram illustrating a pixel unit according to some example embodiments of the present disclosure.

FIG. 5 is a diagram illustrating a pixel unit according to some example embodiments of the present disclosure.

In drawings from FIG. 5, a case where the pixel unit 15 includes pixels of the same first color is assumed for convenience of description. An image may be a single color image. According to some example embodiments, the pixel unit 15 may further include pixels of a second color, and the embodiments of the present disclosure may be equally applied to the pixels of the second color. Also, the pixel unit 15 may further include pixels of a third color, and the embodiments of the present disclosure may be equally applied to the pixels of the third color. When the embodiments of the present disclosure are overlappingly applied to the pixels of the first color, the second color, and the third color, an image may be multi-color image.

The pixels of the first color, the second color, and the third color may be arranged in various structures. When the pixels of the pixel unit 15 are arranged in a Pentile structure, pixels of the first color, the second color, the first color, and the third color may be repeatedly arranged with respect to the same scan line.

Hereinafter, the area, width, length, and the like of each pixel mean those of an emission area (i.e., an emitting layer of a light emitting diode) of the pixel, and do not mean those of a pixel circuit. The area, width, length, and the like of each pixel may vary depending on a color of the pixel. However, for convenience of description, a case where the pixels have the same shape and size is assumed.

According to some example embodiments, scan lines SLG1 to SLG5 may extend in a first direction DR1, and data lines may extend in a second direction DR2. The first direction DR1 and the second direction DR2 may be orthogonal to each other. A virtual line connecting first pixels of the respective scan lines may be defined as a first edge EDG1, and a virtual line connecting last pixels of the respective scan lines may be defined as a second edge EDG2.

First pixels PX1 may be connected to a first scan line SLG1. Second pixels PX2 may be connected to a second scan line SLG2. Third pixels PX3 may be connected to a third scan line SLG3. Fourth pixels PX4 may be connected to a fourth scan line SLG4. Fifth pixels PX5 may be connected to a fifth scan line SLG5.

The first scan line SLG1, the second scan line SLG2, the third scan line SLG3, the fourth scan line SLG4, and the fifth scan line SGL5 may be sequentially arranged along the second direction DR2. According to some example embodiments, at least one scan line may be further located between the respective scan lines SLG1 to SLG5. For example, at least one scan line may be further located between the third scan line SLG3 and the fourth scan line SLG4. In addition, for example, at least one scan line may be further located between the fourth scan line SLG4 and the fifth scan line SLG5.

Third data lines DLG3 may be located between some DLG1*a* of first data lines and second data lines DLG2, and fourth data lines DLG4 may be located between the second data lines DLG2 and the others DLG1*b* among the first data lines. In some embodiments, at least one data line may be further located between the respective data lines DLG1*a*, DLG3, DLG2, DLG4, and DLG1*b*.

Hereinafter, an image portion displayed by third pixels PX3, fourth pixels PX4, and fifth pixels PX5, which are connected to the second data lines DLG2, and fourth pixels PX4 connected to the third and fourth data lines DLG3 and DLG4 is assumed and described as a second image area.

FIGS. 6 to 13 are diagrams illustrating a pixel shift method according to some example embodiments of the present disclosure.

Figure 6:
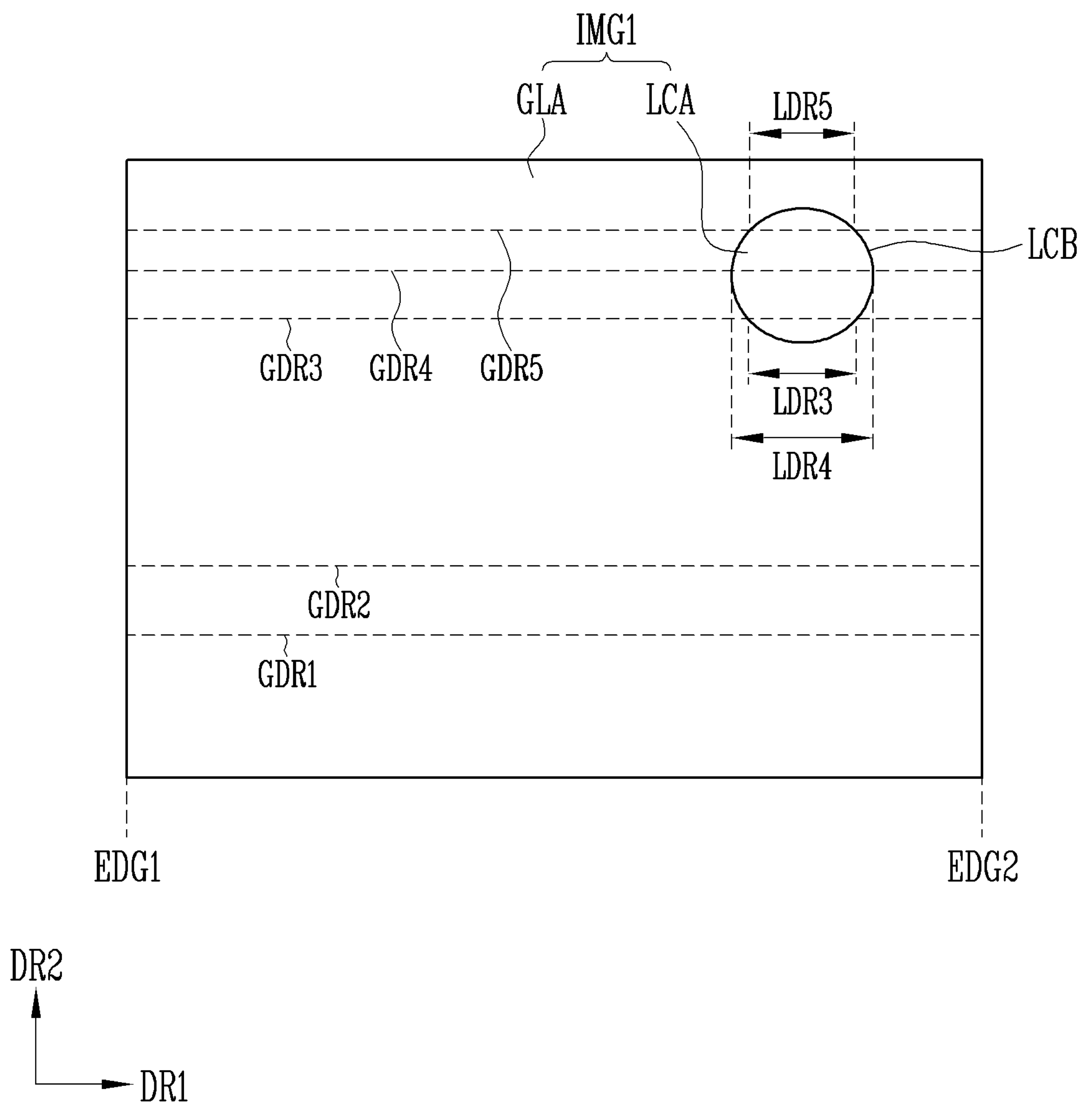
FIGS. 6 to 13 are diagrams illustrating a pixel shift method according to some example embodiments of the present disclosure.

Referring to FIG. 6, a first image IMG1 may include a first image area GLA and a second image area LCA. The second image area LCA may be display information fixed with respect to time, such as a logo. The first image area GLA may be display information flexible with respect to time, such as a general moving image. Therefore, some example embodiments according to the present disclosure may secure a shift amount and a shift frequency of the second image area LCA, which are greater than those of the first image area GLA.

The second image area LCA may have an edge LCB, and may be surrounded by the first image area GLA at the edge LCB. The edge LCB may extend in a direction (e.g., an oblique direction) different from the first direction DR1 and the second direction DR2. According to some example embodiments, the edge LCB may be provided in the shape of one of an ellipse and a circle. According to some example embodiments, the edge LCB may be provided in the shape of a rhombus, a trapezoid, a quadratic curve, or the like.

The first image IMG1 may be configured with a plurality of grayscale rows GDR1 to GDR5.

Grayscale values of a first grayscale row GDR1 may correspond to the first pixels PX1 of the first scan line SLG1. Grayscale values of a second grayscale row GDR2 may correspond to the second pixels PX2 of the second scan line SLG2. Grayscale values of a third grayscale row GDR3 may correspond to the third pixels PX3 of the third scan line SLG3. Grayscale values of a fourth grayscale row GDR4 may correspond to the fourth pixels PX4 of the fourth scan line SLG4. Grayscale values of a fifth grayscale row GDR5 may correspond to the fifth pixels PX5 of the fifth scan line SLG5.

Figure 7:
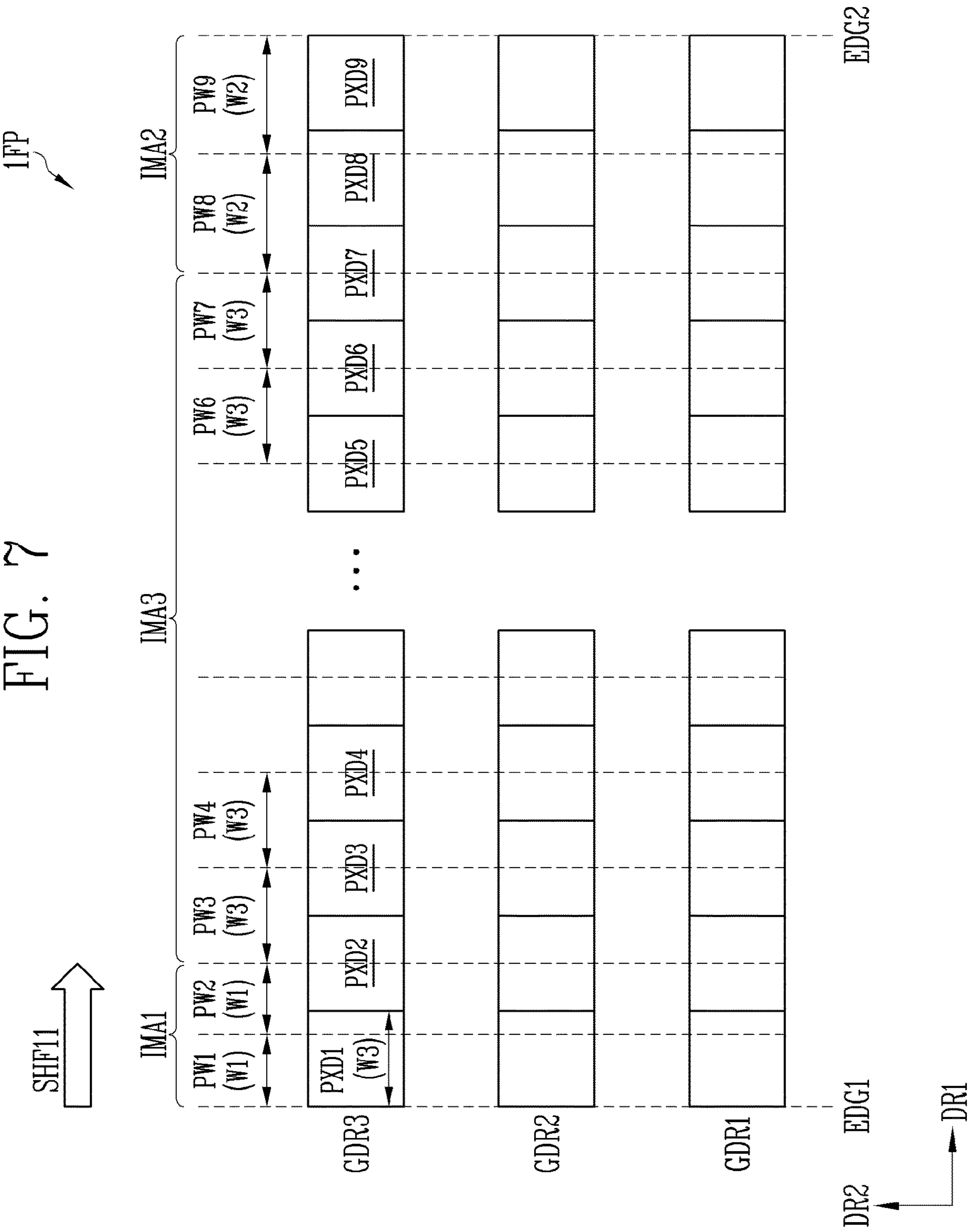

First, referring to FIG. 7, the shift direction determiner 162 may provide a first shift command SHF11 with respect to the first image area GLA. For example, in the first shift command SHF11, a shift direction may be the first direction DR1, and a shift amount may be ½ of a pixel width W3. The shift amount may be determined with reference to pixels of a third window area IMA3. Accordingly, the first area definer 163*a* may set a width of a second window area IMA2 to be larger than a width of a first window area IMA1. That is, the second window area IMA2 may be set as a down-scaling area, and the first window area IMA may be set as an up-scaling area.

Next, the first data organizer 164*a* may set pixel windows PW1 and PW2 with a first width W1, which are to be included in the first window area IMA1, set pixel windows PW8 and PW9 with a second width W2, which are to be included in the second window are IMA2, and set pixel windows PW3, PW4, PW6, and PW7 with a third width W3, which are to be included in the third window area IMA3. For example, a number of the pixel windows to be included in the first window area IMA1 and a number of the pixel windows to be included in the second window area IMA2 may be set equal to each other. As described above, when the widths W1, W2, and W3 of the pixel windows are set or predetermined, it may be determined that two pixel windows PW1 and PW2 are included in the first window image IMA1, two pixel windows PW8 and PW9 are included in the second window area IMA2, and the other pixel windows PW3, PW4, PW6, and PW7 are included in the third window area IMA3. For example, there is assumed a case where the first width W1 is set to ¾ of the third width W3 and the second width W2 is set to 5/4 of the third width W3. First data organization information on the pixel window PW1 may be provided as shown in the following Equation 1.

$$DC1[PW1]=(V[PXD1]*W3*3/4)/W1=V[PXD1] \quad \text{Equation 1}$$

DC1[PW1] is the first data organization information DC1 on the pixel window PW1, and V[PXD1] is a variable indicating a grayscale value PXD1 mapped (overlapping) to the pixel window PW1.

Similarly, first data organization information DC1 on the pixel window PW2 may be provided as shown in the following Equation 2.

$$DC1[PW2]=(V[PXD1]*W3*1/4+V[PXD2]*W3*1/2)/W1=V[PXD1]*1/3+V[PXD2]*2/3 \quad \text{Equation 2}$$

DC1[PW2] is the first data organization information DC1 on the pixel window PW2, and V[PXD1] and V[PXD2] are variables indicating grayscale values PXD1 and PXD2 mapped to the pixel window PW2.

Similarly, first data organization information DC1 on the pixel window PW3 may be provided as shown in the following Equation 3.

$$DC1[PW3]=(V[PXD2]*W3*2/4+V[PXD3]*W3*2/4)/W3=V[PXD2]*1/2+V[PXD3]*1/2 \quad \text{Equation 3}$$

DC1[PW3] is the first data organization information DC1 on the pixel window PW3, and V[PXD2] and V[PXD3] are variables indicating grayscale values PXD2 and PXD3 mapped to the pixel window PW3. Calculations on the pixel windows PW4 to PW7 of the third window area IMA3 are similar to that using Equation 3, and therefore, their descriptions will be omitted.

Similarly, first data organization information DC1 on the pixel window PW8 may be provided as shown in the following Equation 4.

$$DC1[PW8]=(V[PXD7]*W3*2/4+V[PXD8]*W3*3/4)/W2=V[PXD7]*2/5+V[PXD8]*3/5 \quad \text{Equation 4}$$

DC1[PW8] is the first data organization information DC1 on the pixel window PW8, and V[PXD7] and V[PXD8] are variables indicating grayscale values PXD7 and PXD8 mapped to the pixel window PW8.

Similarly, first data organization information DC1 on the pixel window PW9 may be provided as shown in the following Equation 5.

$$DC1[PW9]=(V[PXD8]*W3*1/4+V[PXD9]*W3*4/4)/W2=V[PXD8]*1/5+V[PXD9]*4/5 \quad \text{Equation 5}$$

DC1[PW9] is the first data organization information DC1 on the pixel window PW9, and V[PXD8] and V[PXD9] are variables indicating grayscale values PXD8 and PXD9 mapped to the pixel window PW9.

Equations 1 to 5 described above have been described with respect to the grayscale row GDR3, but may be applied, in the same manner, to all the grayscale rows GDR1, GDR2, GDR3, GDR4, and GDR5 of the first image area GLA, based on the same first shift command SHF11. Thus, the first pixel windows of the first image IMG1 can be organized.

Figure 8:
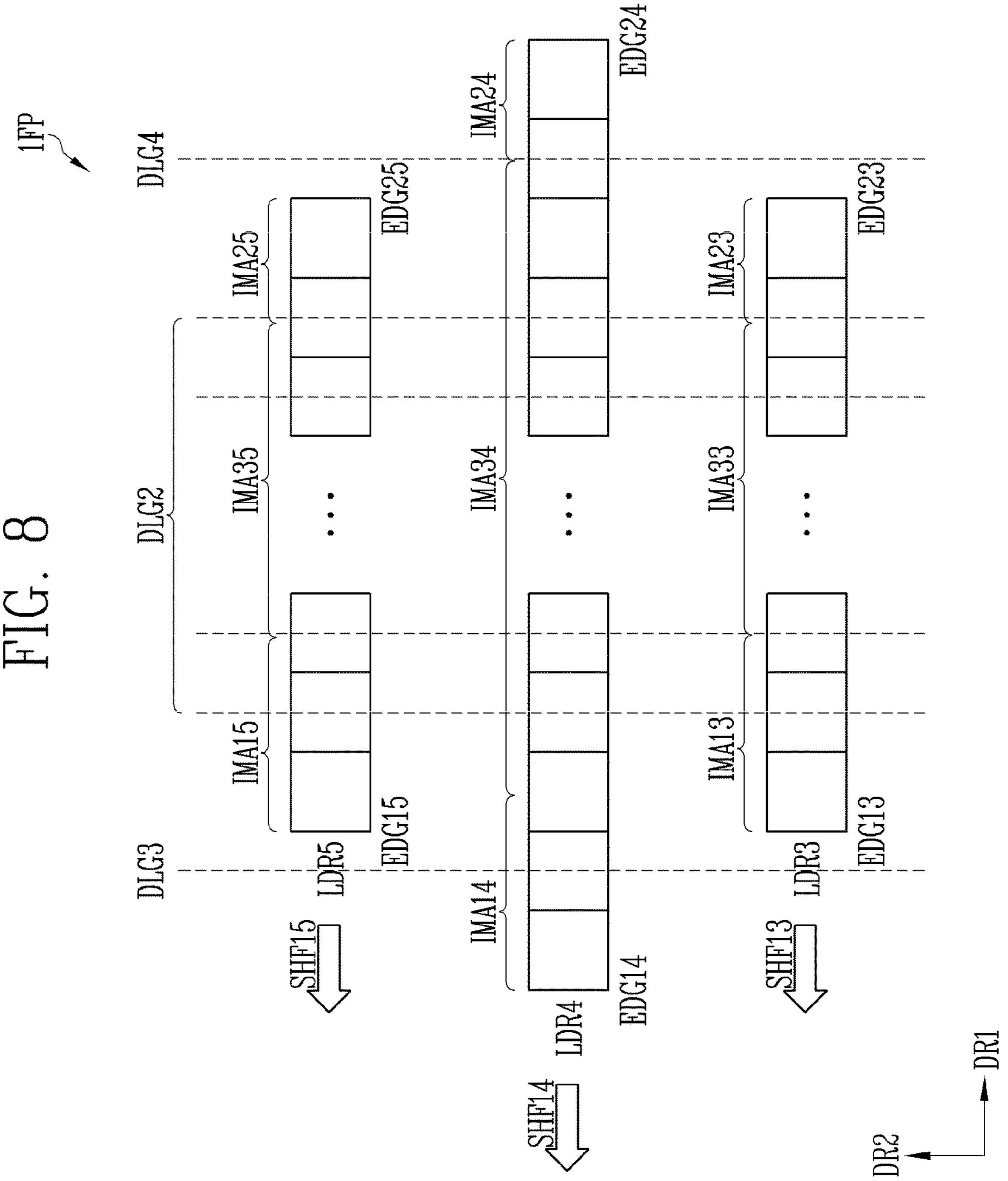

Next, referring to FIG. 8, the shift direction determiner 162 may provide first shift commands SHF13, SHF14, and SHF15 with respect to the second image area LCA.

There is assumed a case where the edge LCB of the second image area LCA is provided by a logo detection algorithm, or is set or predetermined. Edges EDG13 and EDG23 on the third grayscale row GDR3 may correspond to a portion of the edge LCB, edges EDG14 and EDG24 on the fourth grayscale row GDR4 may correspond to a portion of the edge LCB, and edges EDG15 and EDG25 on the fifth grayscale row GDR5 may correspond to a portion of the edge LCB. A third grayscale row portion LDR3 may be defined as grayscale values located between the edges EDG13 and EDG23 among the grayscale values of the third grayscale row GDR3. A fourth grayscale row portion LDR4 may be defined as grayscale values located between the edges EDG14 and EDG24 among the grayscale values of the fourth grayscale row GDR4. A fifth grayscale row portion LDR5 may be defined as grayscale values located between the edges EDG15 and EDG25 among the grayscale values of the fifth grayscale row GDR5.

For example, the edges EDG13 and EDG15 may be located in the first direction DR1 from the third data lines DLG3. The edge EDG14 may be located in the opposite direction of the first direction DR1 from the third data lines DLG3. The edges EDG23 and EDG25 may be located in the opposite direction of the first direction DR1 from the fourth data lines DLG4. The edge EDG14 may be located in the first direction DR1 from the fourth data lines DLG4.

In FIGS. 5 and 8, for convenience, one third data line DLG3 and one fourth data line DLG4 are illustrated. However, the second area LCA is sufficiently large, a plurality of third data lines DLG3 and a plurality of fourth data lines DLG4 may be provided.

A first window area IMA13, a second window area IMA23, a third window area IMA33 may be determined at the third grayscale row portion LDR3, based on the first shift command SHF13. The shift direction of the first shift command SHF13 may be a direction different from the first direction DR1 (e.g., the opposite direction of the first direction DR1). Therefore, the first window area IMA13 may be larger than the second window area IMA23. Subsequently, pixel windows of each of the window areas IMA13, IMA23, and IMA33 are set by the first data organizer 164*a*, and the first pixel windows are re-organized, so that second pixel windows of the first image IMG1 can be organized (see Equation 6).

$$DC1[2ndPW]=DC1[1stPW\_1]*wgh1+DC1[1stPW\_2]*wgh2 \quad \text{Equation 6}$$

DC1[2ndPW] is first data organization information DC1 on a second pixel window, DC1[1stPW_1] and DC1 [1stPW_2] are first data organization information DC1 on two adjacent first pixel windows, and wgh1 and wgh2 may be weights (overlapping ratios).

Finally generated first data organization information DC1 may include information on second pixel windows of the third grayscale row portion LDR3 and information on first pixel windows of the other third grayscale row GDR3 except the third grayscale row portion LDR3.

Information on pixel windows of the fourth grayscale row portion LDR4 and the fifth grayscale row portion LDR5 may also be included in the first data organization information DC1 in the same manner.

The first data calculator 165*a* may convert the first image IMG1 into a second image IMG2 by using the first data organization information DC1.

Figure 9:
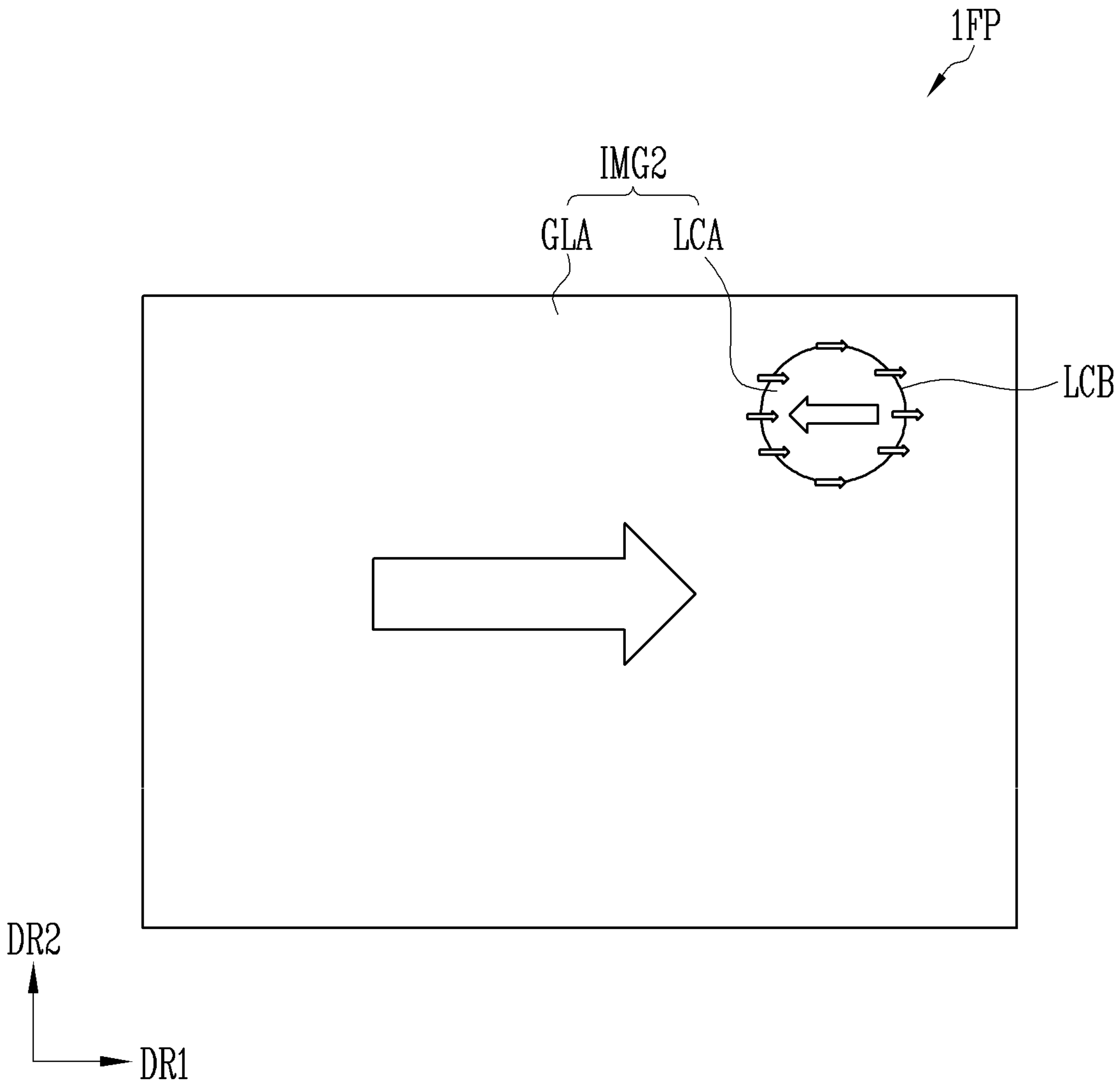

Referring to FIG. 9, the second image IMG2 generated by the shift controller 16 in a first frame period 1FP through the processes shown in FIGS. 6 to 8 is illustrated. The first image area GLA has been shifted in the first direction DR1 in the first frame period 1FP.

Referring to the description shown in FIG. 7, a shift amount of the grayscale values PXD1 and PXD9 adjacent to the edges EDG1 and EDG2 overlapping with the first window area IMA1 and the second window area IMA2 may be smallest. In addition, a shift amount of the grayscale values PXD3 to PXD7 located in the third window area IMA3 may be greatest. Similarly, in FIG. 8, a shift amount of grayscale values adjacent to the edge LCB of the second image area LCA may be smallest.

Therefore, in spite of the first shift commands SHF13, SHF14, and SHF15 with respect to the second image area LCA, the edge LCB of the second image area LCA may be roughly shifted in the first direction DR1 by the first shift command SHF11 with respect to the first image area GLA. That is, a position of the edge LCB before the edge LCB is shifted and a position of the edge LCB in the first frame period 1FP after the edge LCB is shifted may be different from each other.

However, a central portion of the second image area LCA may correspond to third window areas IMA33, IMA34, and IMA35 based on the first shift commands SHF13, SHF14, and SHF15, and correspond to the second window area IMA2 based on the first shift command SHF11. Therefore, the central portion of the second image area LCA may be shifted in the opposite direction of the first direction DR1 by the first shift commands SHF13, SHF14, and SHF15 having a shift amount relatively greater than that of the first shift command SHF11. That is, in the first frame period 1FP, a portion of an internal area of the second image area LCA may be shifted in the opposite direction of the first direction DR1.

According to some example embodiments, the second image area LCA may be periodically shifted with a first cycle, and the first image area GLA may be periodically shifted with a second cycle. The first cycle and the second cycle may be different from each other. For example, the first cycle may be shorter than the second cycle. For example, the first shift command SHF11 with respect to the first image area GLA may be generated in a unit of three frame periods, and the first shift commands SHF13, SHF14, and SHF15 with respect to the second image area LCA may be generated in a unit of two frame periods. Accordingly, a sufficient shift amount can be provided to the second image area LCA in which degradation is serious due to a logo sign, etc., and randomness of shift of the second image area LCA is increased, which is more effective in degradation distribution.

Figure 10:
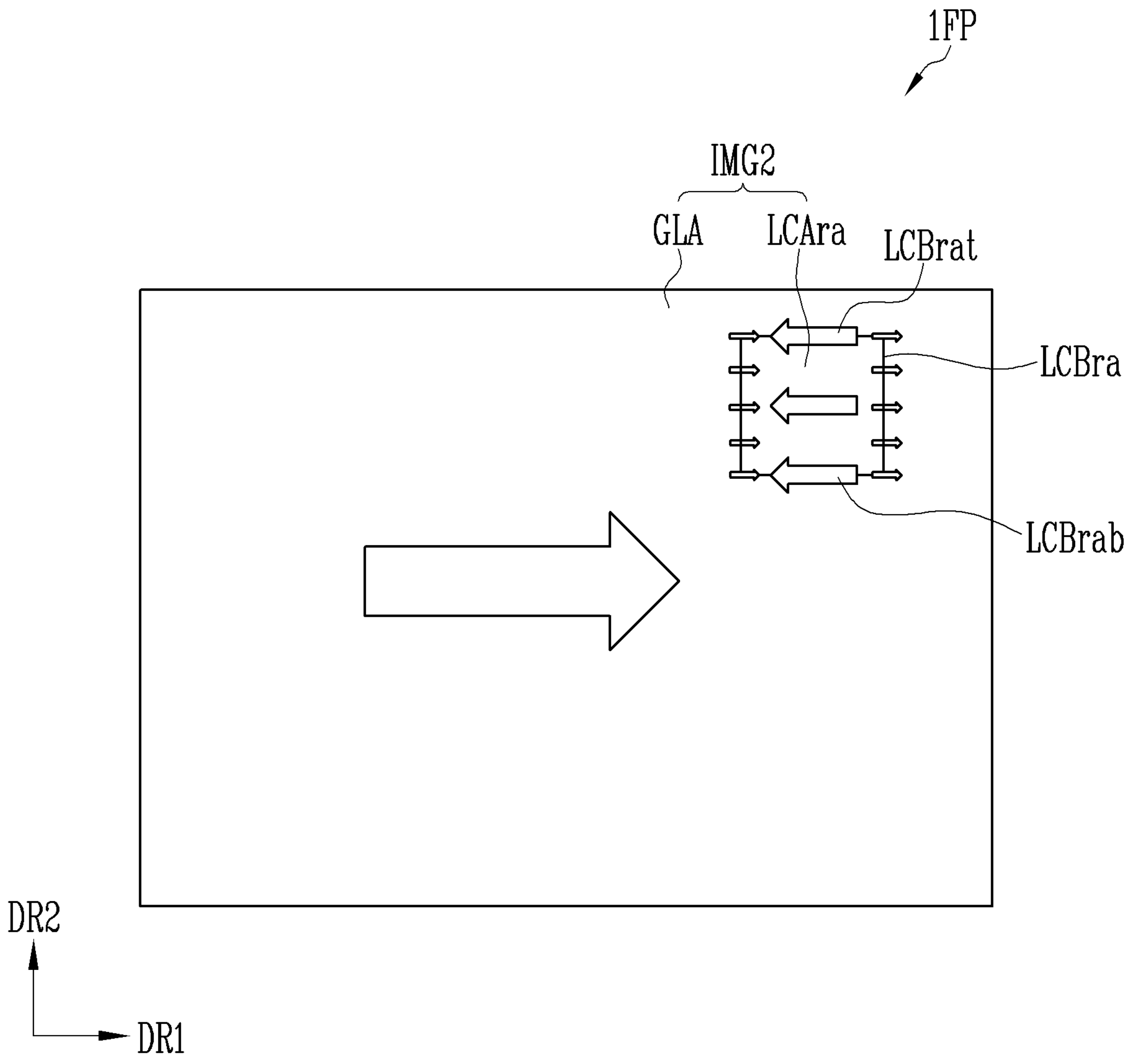

Referring to FIG. 10, a comparative example in which an edge LCBra of a second image area LCAra is provided in a quadrangular shape. Although the pixel shift method shown in FIGS. 6 to 8 is applied, intermediate areas of an upper portion LCBrat and a lower portion LCBrab of the edge LCBra are shifted throughout a long range in a direction opposite to that a shift direction of the first image GLA, and therefore, it is highly likely that the edge LCBra will be viewed by a user.

On the other hand, referring to FIG. 9, portions of the edge LCB, which conflict with a shift direction of the first image area GLA, can be appropriately distributed by the edge LCB of the second image area LCA provided in the circular shape, and therefore, it is highly likely that the boundary LCB will not be viewed by a user.

Figure 11:
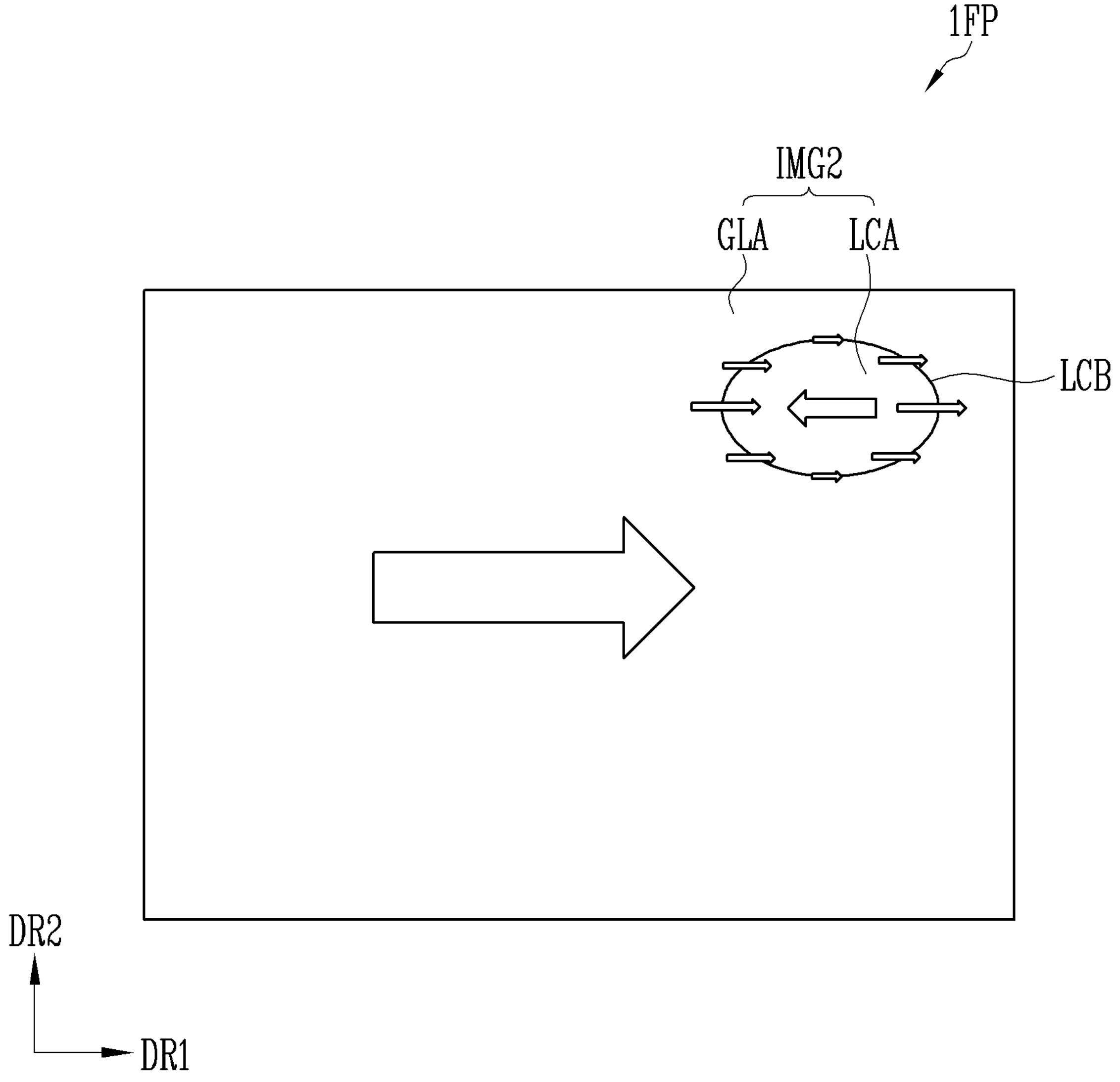

Referring to FIG. 11, the edge LCB of the second image area LCA may be provided in an elliptical shape. Because the edge LCB having the elliptical shape is similar to the viewing angle shape of a person, the edge LCB can exhibit a considerable effect on non-visibility of the edge LCB. The randomness of shift of the second image area LCA is further increased as compared with when the edge LCB is provided in the circular shape, which is more effective in degradation distribution.

Figure 12:
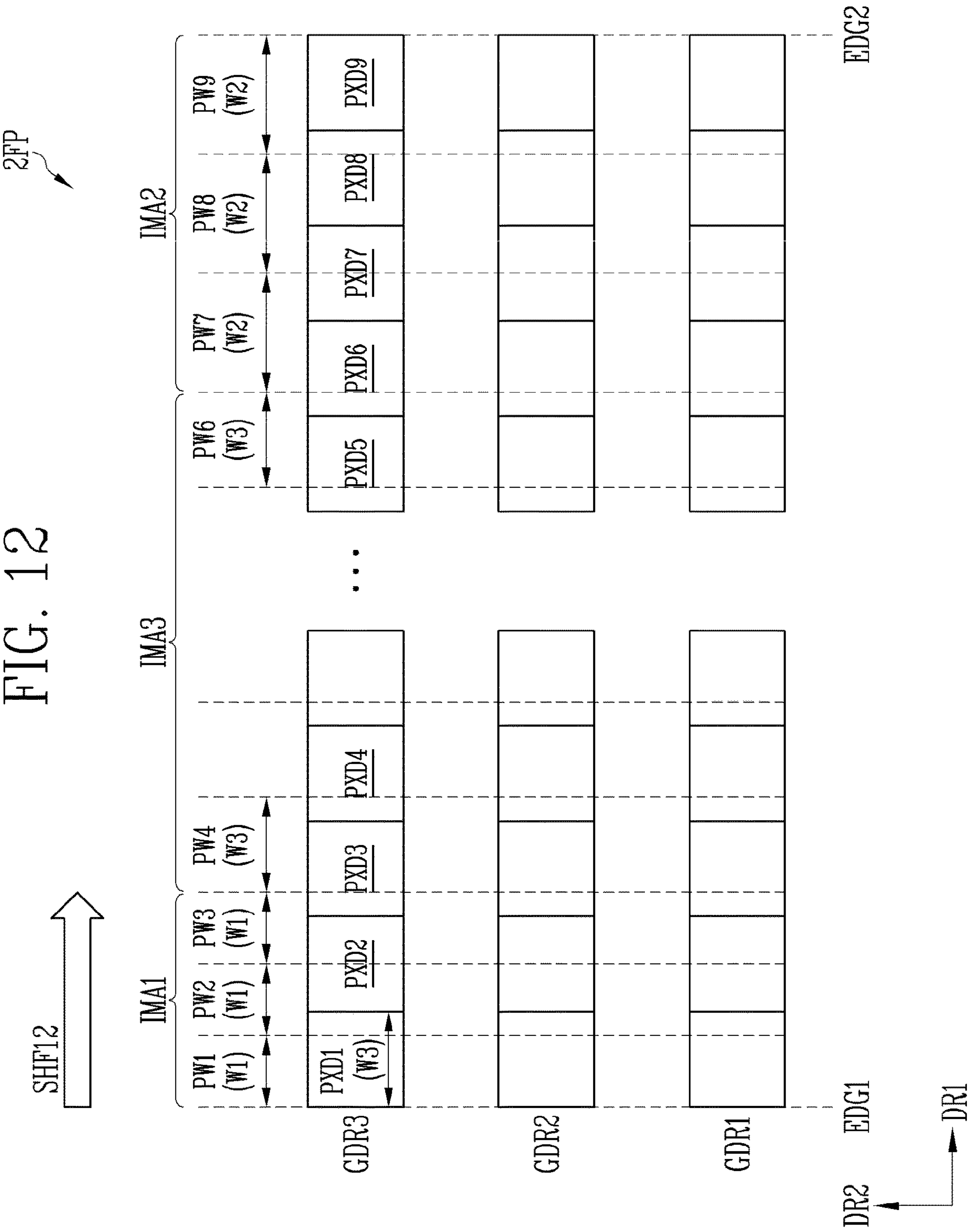
Figure 13:
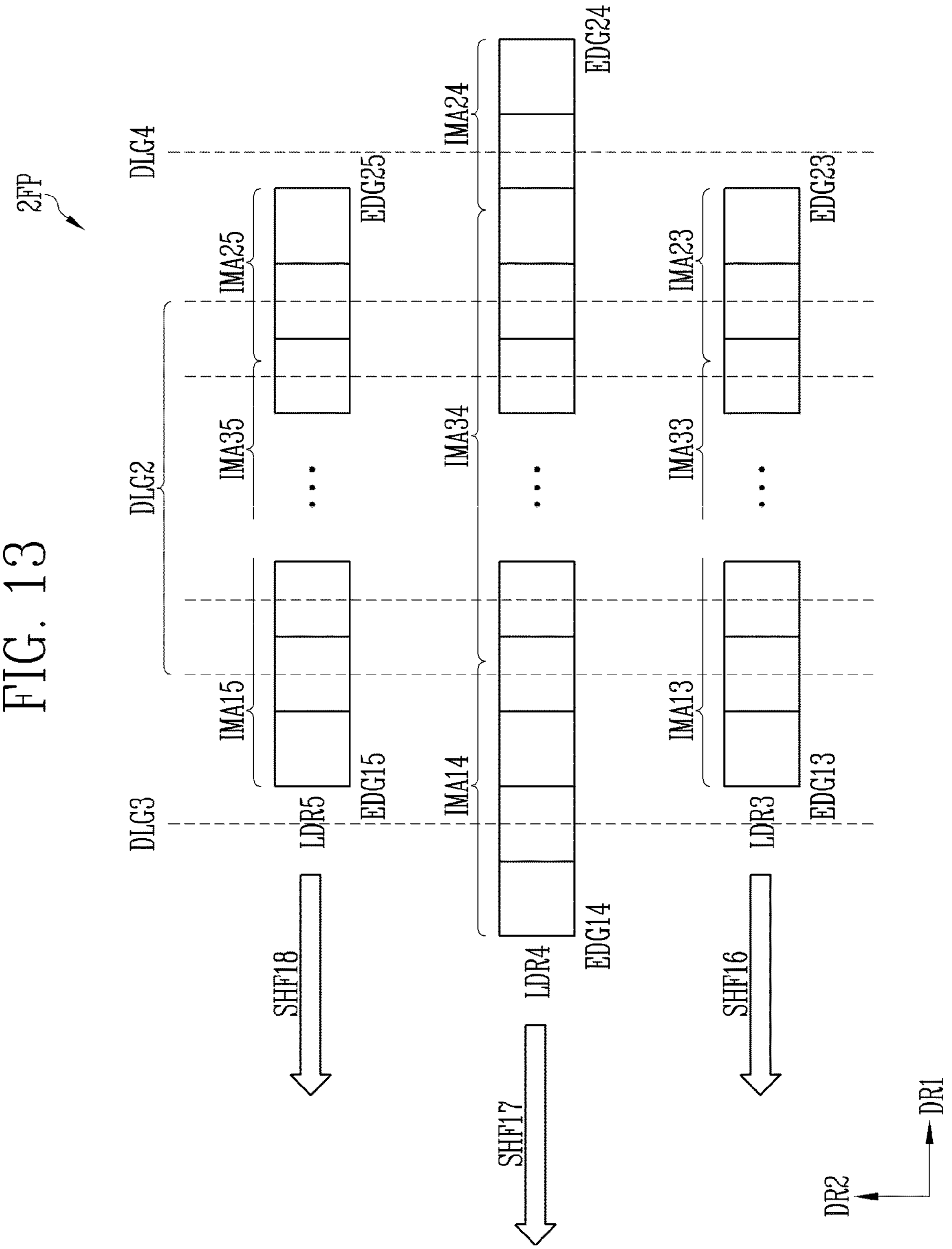

Referring to FIGS. 12 and 13, window areas based on example first shift commands SHF12, SHF16, SHF17, and SHF18 in a second frame period 2FP next to the first frame period 1FP are illustrated.

A shift amount of the first shift command SHF12 shown in FIG. 12 may be greater than a shift amount of the first shift command SHF1 shown in FIG. 7. For example, while the first window area IMA1 shown in FIG. 7 includes two pixel windows PW1 and PW2, the first window area IMA1 shown in FIG. 12 may include three pixel windows PW1, PW2, and PW3. In addition, while the second window area IMA2 shown in FIG. 7 includes two pixel windows PW8 and PW9, the second window area IMA2 shown in FIG. 12 may include three pixel windows PW7, PW8, and PW9. On the other hand, a number of the pixel windows PW3 to PW7 included in the third window area IMA3 shown in FIG. 7 may be greater than that of the pixel windows PW4 to PW6 included in the third window area IMA3 shown in FIG. 12.

A shift amount of the first shift commands SHF16, SHF17, and SHF18 shown in FIG. 13 may be greater than that of the first shift commands SHF13, SHF14, and SHF15 shown in FIG. 8. Therefore, some repetitive description may be omitted.

As described above, according to some example embodiments, in the second frame period 2FP next to the first frame period 1FP with respect to a position in the first frame period 1FP, an image portion displayed by first pixels PX1, second pixels PX2, and third pixels PX3, which are connected to first data lines DLG1*a* and DLG1*b*, may be shifted in the first direction DR1. In the second frame period 2FP, an image portion displayed by first pixels PX1 and second pixels PX2, which are connected to the second data lines DLG2, may be shifted in the first direction DR1. In the second frame period 2FP, an image portion displayed by third pixels PX3 connected to the second data lines DLG2 may be shifted in a direction different from the first direction DR1.

As described above, according to some example embodiments, in the second frame period 2FP, an image portion displayed by fourth pixels PX4 connected to the third data lines DLG3 and the fourth data lines DLG4 may be shifted in a direction different from the first direction DR1. In the second frame period 2FP, an image portion displayed by third pixels PX3 connected to the third data lines DLG3 and the fourth data lines DLG4 may be shifted in the first direction DR1.

As described above, according to some example embodiments, in the second frame period 2FP, an image portion displayed by fourth pixels PX4 connected to the first data lines DLG1*a* and DLG1*b* may be shifted in the first direction DR1.

As described above, according to some example embodiments, in the second frame period 2FP, an image portion displayed by fifth pixels PX5 connected to the second data lines DLG2 may be shifted in a direction different from the first direction DR1. In the second frame period 2FP, an image portion displayed by fifth pixels PX5 connected to the first data lines DLG1, the third data lines DLG3, and the fourth data lines DLG4 may be shifted in the first direction DR1.

FIGS. 14 to 21 are diagrams illustrating a pixel shift method according to some example embodiments of the present disclosure.

Figure 14:
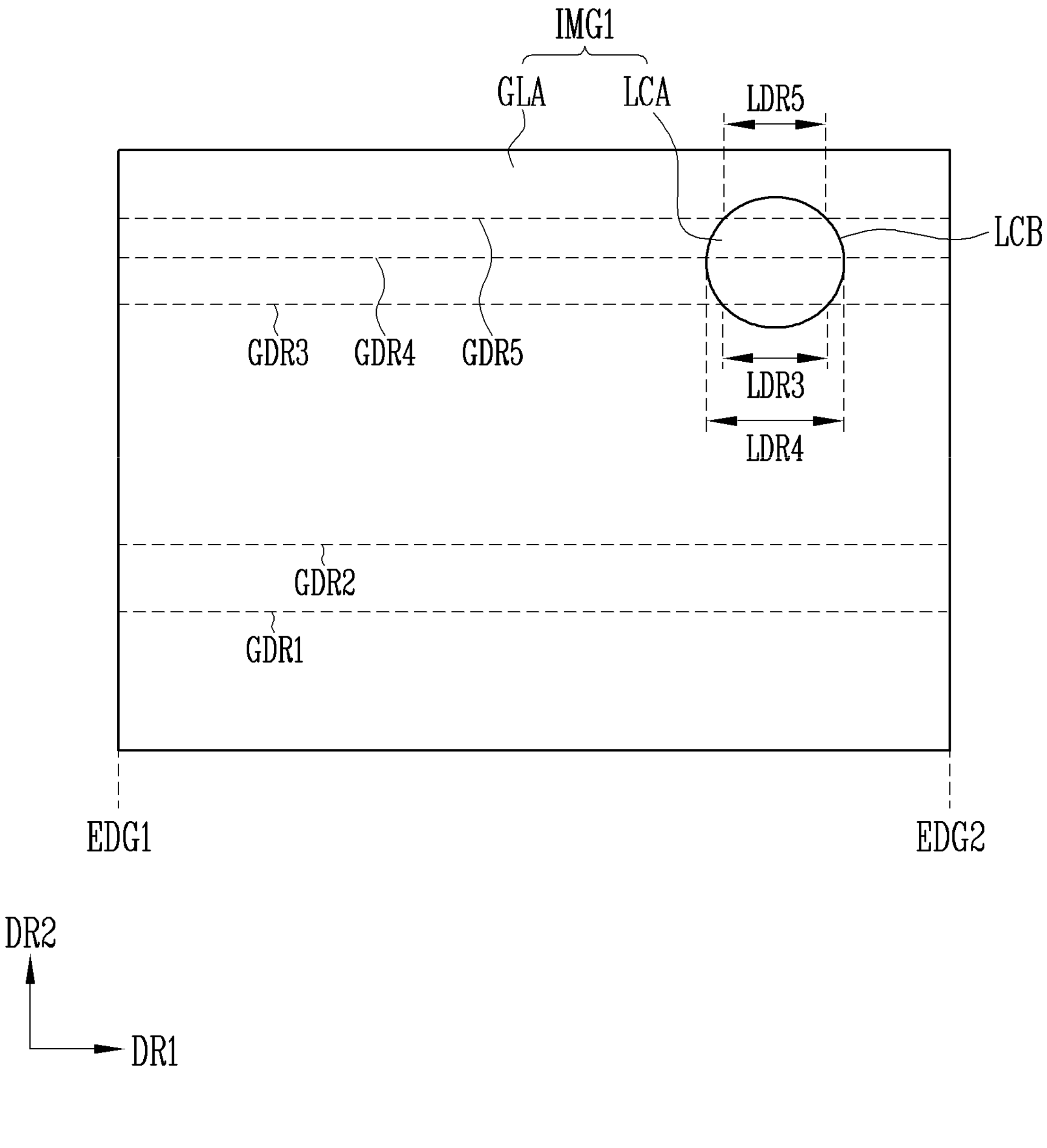
FIGS. 14 to 21 are diagrams illustrating a pixel shift method according to some example embodiments of the present disclosure.
Figure 15:
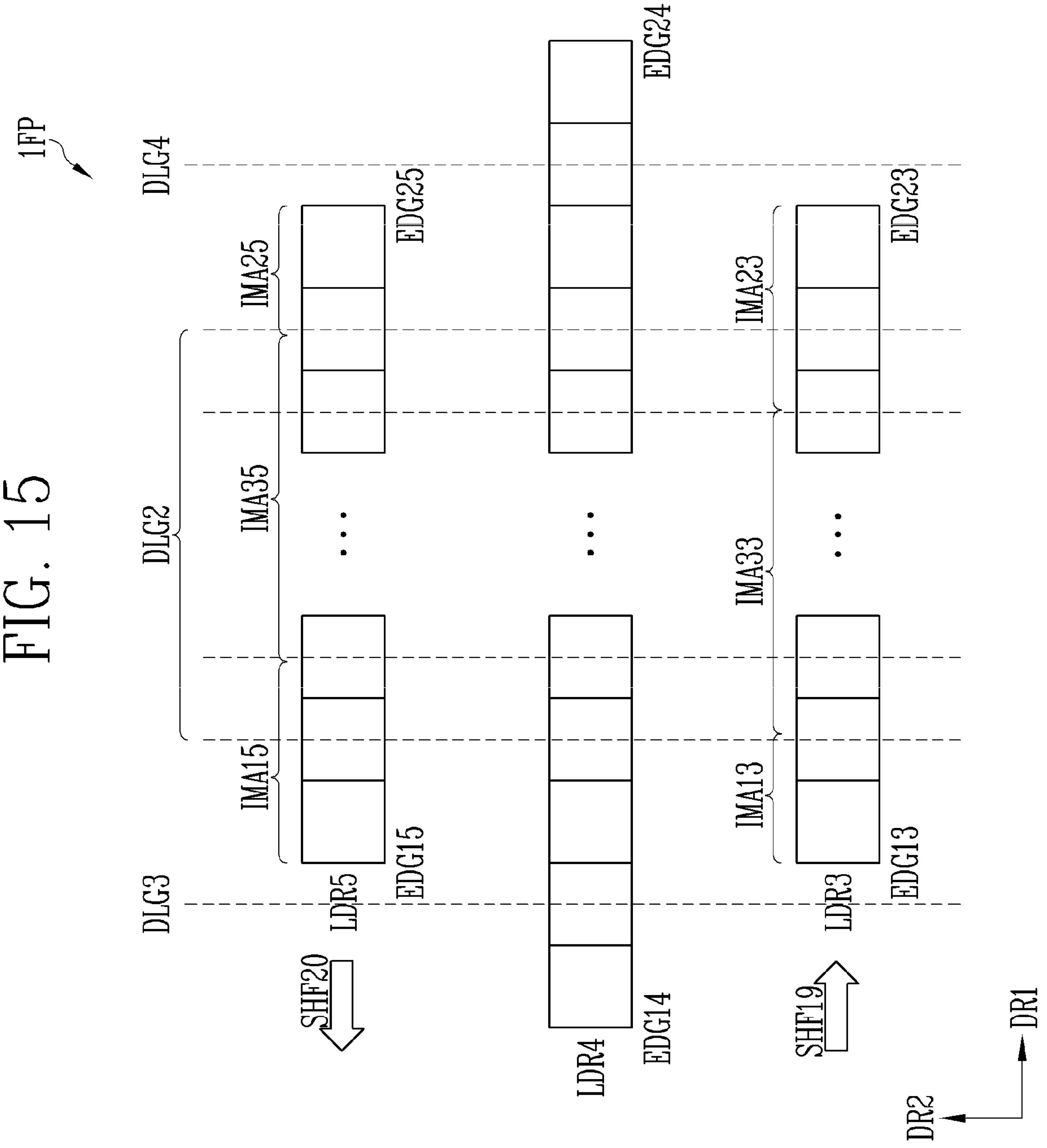

Referring to FIGS. 14 and 15, a process in which a first image IMG1 is converted into a second image IMG2 by the shift direction determiner 162, the first area definer 163*a*, the first data organizer 164*a*, and the first data calculator 165*a* will be described.

There is assumed a case where the shift direction determiner 162 provides a first shift command in the first direction DR1 with respect to the first image area GLA. A description related to this is identical to that shown in FIGS. 6 and 7, and therefore, overlapping descriptions related to FIG. 14 will be omitted.

Referring to FIG. 15, a case where a first shift command SHF20 in the opposite direction of the first direction DR1 is provided with respect to the fifth grayscale row portion LDR5 is similar to that shown in FIG. 8. Therefore, the first area definer 163*a* may set a first window area IMA15 to be larger than a second window area IMA25 at the fifth grayscale row portion LDR5.

However, a case where a first shift command SHF19 in the first direction DR1 is provided with respect to the third grayscale row portion LDR3 is different from that shown in FIG. 8. Therefore, the first area definer 163*a* may set the first window area IMA13 to be smaller than the second window area IMA23 at the third grayscale row portion LDR3.

In addition, a case where any first shift command is not provided with respect to the fourth grayscale row portion LDR4 is different from that shown in FIG. 8. The first area definer 163*a* may not set window areas at the fourth grayscale row portion LDR4.

Next, the first data organizer 164*a* may set pixel windows, based on window areas (e.g., set or predetermined window areas), and the first data calculator 165*a* may convert the first image IMG1 into the second image IMG2, based on the pixel windows.

Figure 16:
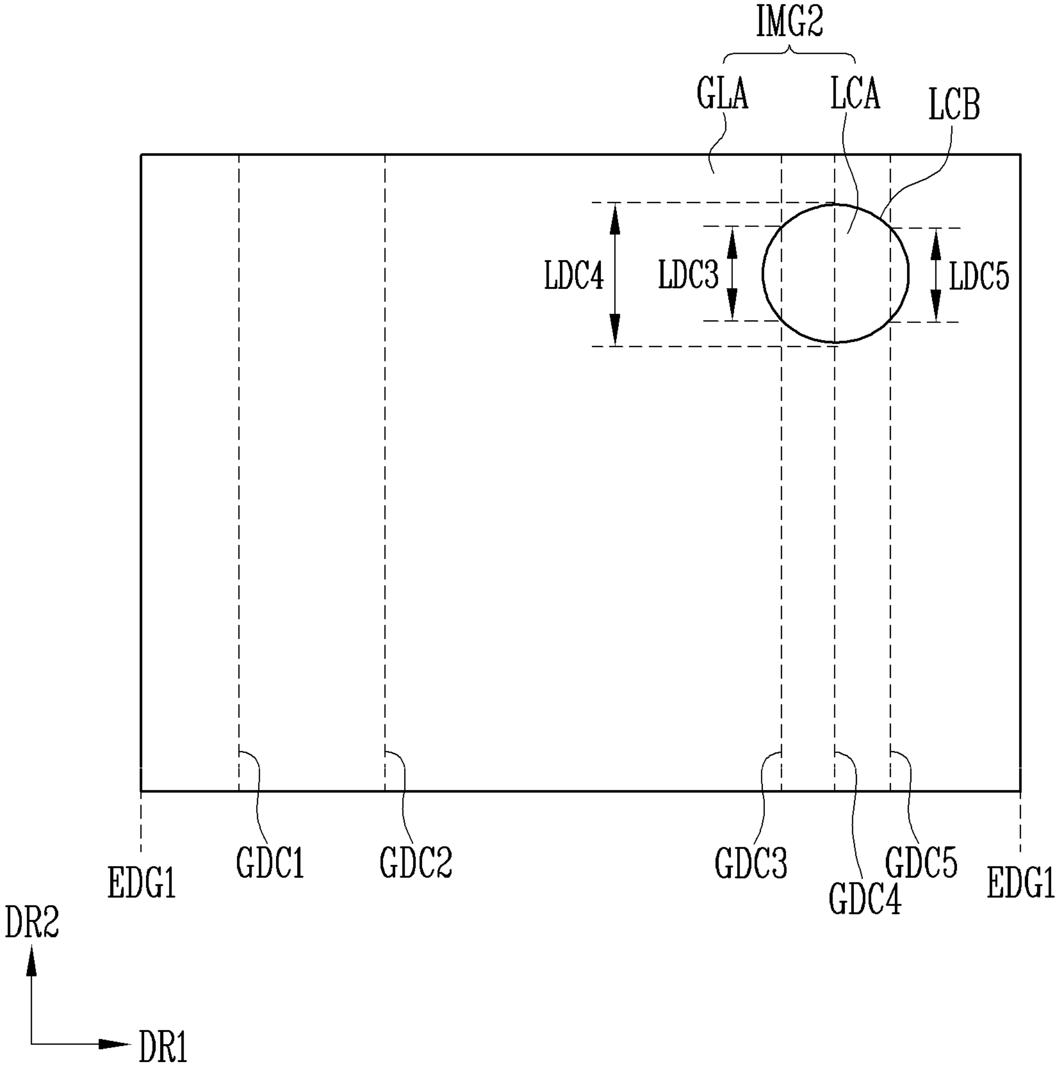
Figure 17:
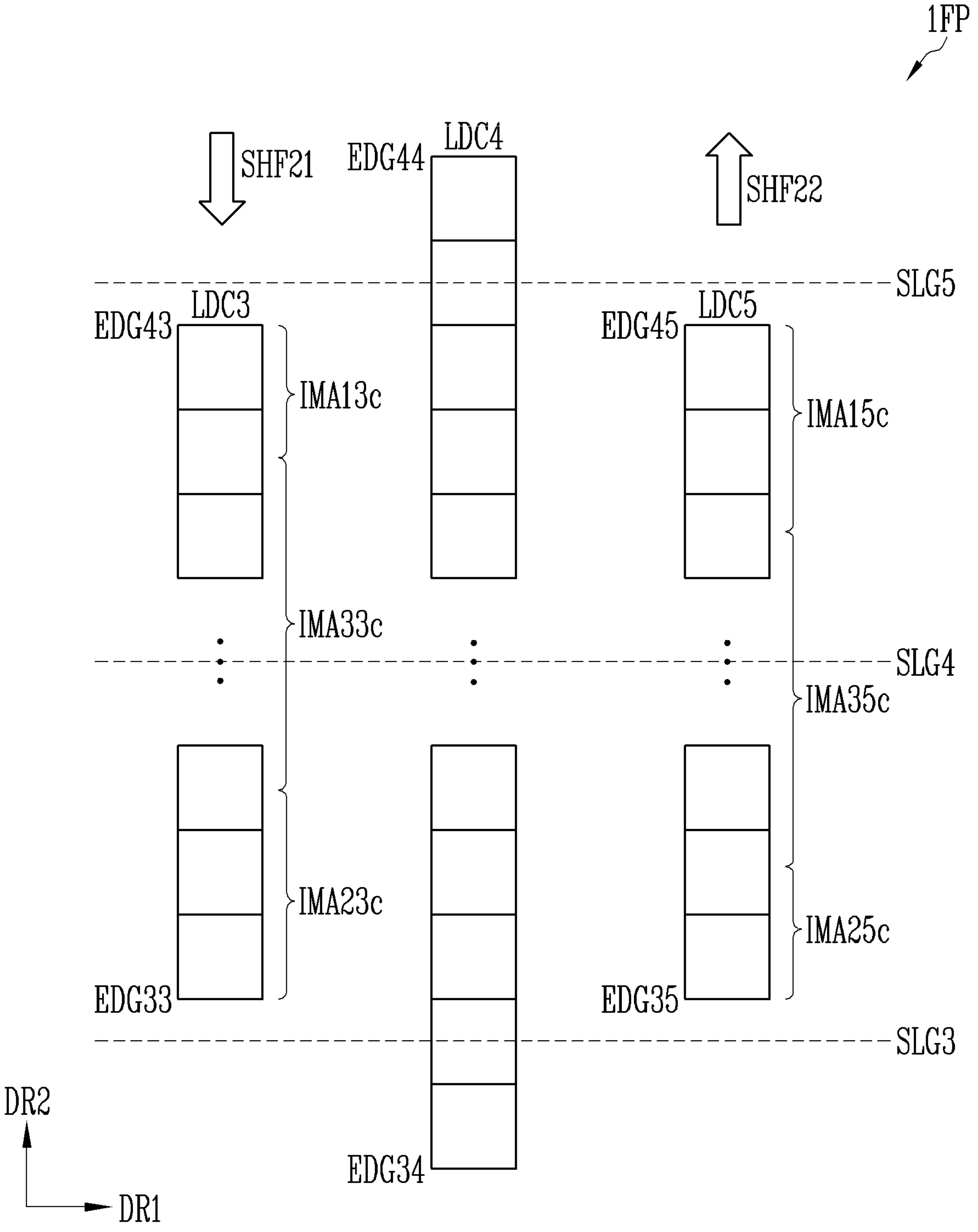

Referring to FIGS. 16 and 17, a process in which the second image IMG2 is converted into a third image IMG3 by the shift direction determiner 162, the second area definer 163*b*, the second data organizer 164*b*, and the second data calculator 165*b* will be described.

Referring to FIG. 16, the second image IMG2 may be configured with a plurality of grayscale columns GDC1 to GDC5. Grayscale values of a first grayscale column GDC1 and a second grayscale column GDC2 may correspond to pixels connected to the first data line DLG1*a*. Grayscale values of a third grayscale column GDC3 may correspond to pixels connected to one of the third data lines DLG3. Grayscale values of a fourth grayscale column GDC4 may correspond to pixels connected to one of the second data lines DLG2. Grayscale values of a fifth grayscale column GDC5 may correspond to pixels connected to one of the fourth data lines DLG4.

There is provided a case where a second shift command in the second direction DR2 is not provided in the first image area GLA.

Referring to FIG. 17, edges EDG33 and EDG43 may correspond to a portion of the edge LCB on the third grayscale column GDC3, edges EDG34 and EDG44 may correspond to a portion of the edge LCB on the fourth grayscale column GDC4, and edges EDG35 and EDG45 may correspond to a portion of the edge LCB on the fifth grayscale column GDC5. A third grayscale column portion LDC3 may be defined as grayscale values located between the edges EDG33 and EDG 43 among the grayscale values of the third grayscale column GDC3. A fourth grayscale column portion LDC4 may be defined as grayscale values located between the edges EDG34 and EDG 44 among the grayscale values of the fourth grayscale column GDC4. A fifth grayscale column portion LDC5 may be defined as grayscale values located between the edges EDG35 and EDG 45 among the grayscale values of the fifth grayscale column GDC5.

For example, the edges EDG33 and EDG35 may be located in the second direction DR2 from the third scan line SLG3. The edge EDG34 may be located in the opposite direction of the second direction DR2 from the third scan line SLG3. The edges EDG43 and EDG45 may be located in the opposite direction of the second direction DR2 from the fifth scan line SLG5. The edge EDG44 may be located in the second direction DR2 from the fifth scan line SLG5.

The shift direction determiner 162 may provide a second shift command SHF21 in the opposite direction of the second direction DR2 with respect to the third grayscale column portion LDC3. Therefore, the second area definer 163*b* may set a first window area IMA13*c* to be smaller than a second window area IMA23*c* at the third grayscale column portion LDC3.

Also, the shift direction determiner 162 may not provide any second shift command with respect to the fourth grayscale column portion LDC4. The second area definer 163*b* may not set window areas with respect to the fourth grayscale column portion LDC4.

Also, the shift direction determiner 162 may provide a second shift command SHF22 in the second direction DR2 with respect to the fifth grayscale column portion LDC5. Therefore, the second area definer 163*b* may set a first window area IMA15*c* to be larger than a second window area IMA25*c* at the fifth grayscale column portion LDC5.

Next, the second data organizer 164*b* may set pixel windows, based on window areas (e.g., set or predetermined window areas), and the second data calculator 165*b* may convert the second image IMG2 into a third image IMG3, based on the pixel windows.

Figure 18:
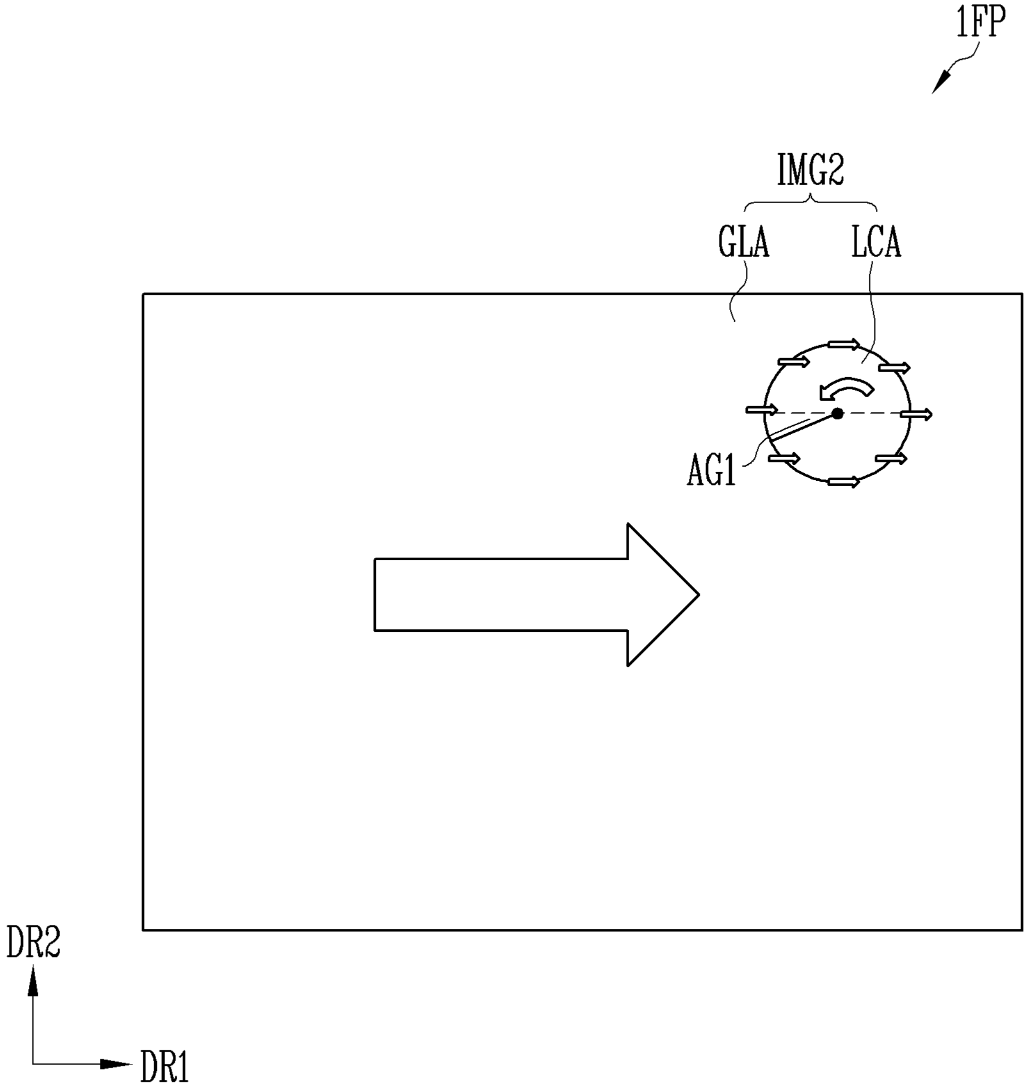

Referring to FIG. 18, a case where a portion of the internal area of the second image area LCA is rotated counterclockwise in the third image IMG3 in the first frame period 1FP is different from that shown in FIG. 9. However, when a rotation angle AG1 is excessively large, the rotation of the second image area LCA may be viewed by a user, and therefore, a maximum value of the rotation angle AG1 may be set or predetermined in a range where the rotation of the second image area LCA is not viewed by the user.

Figure 19:
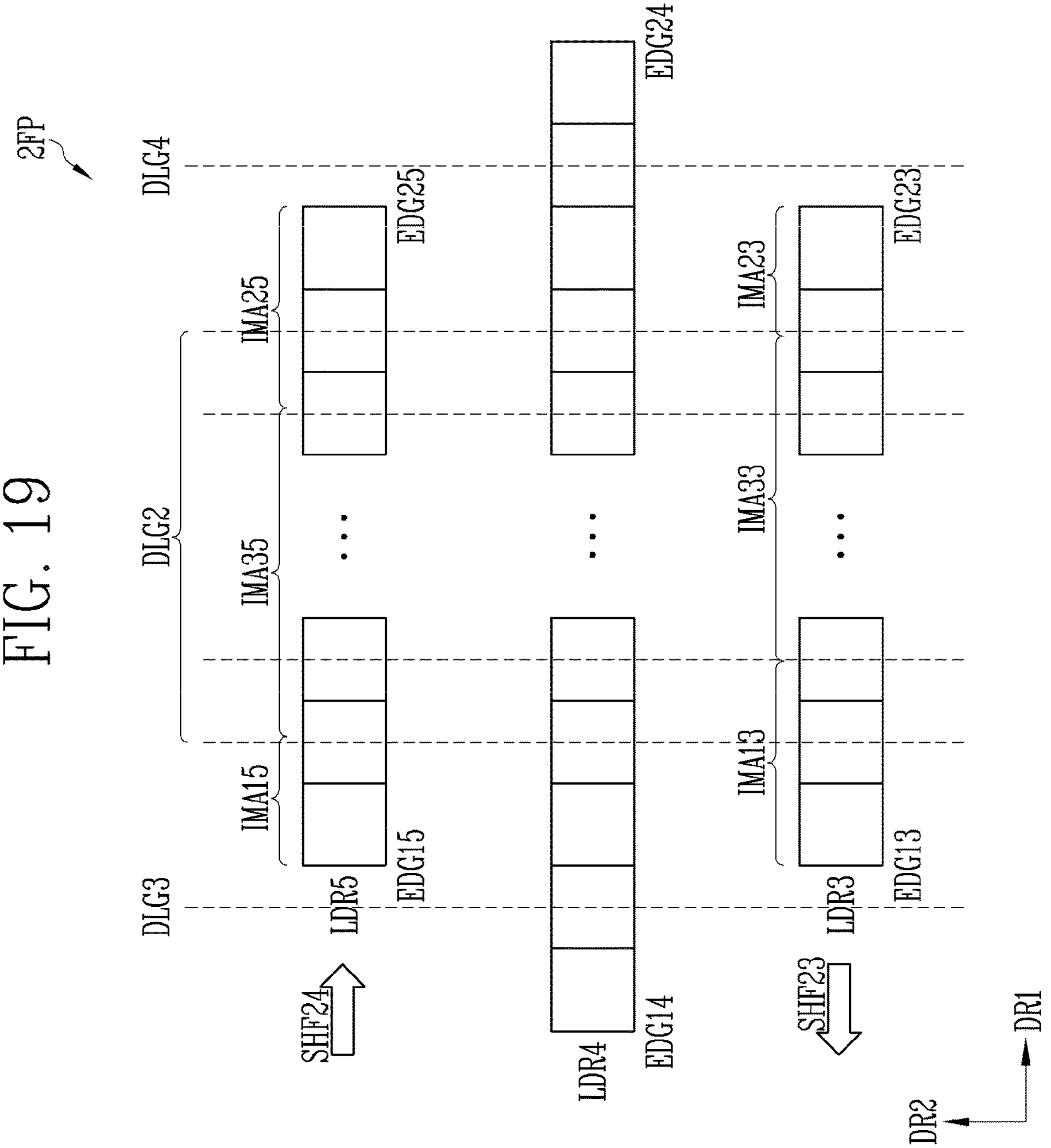
Figure 20:
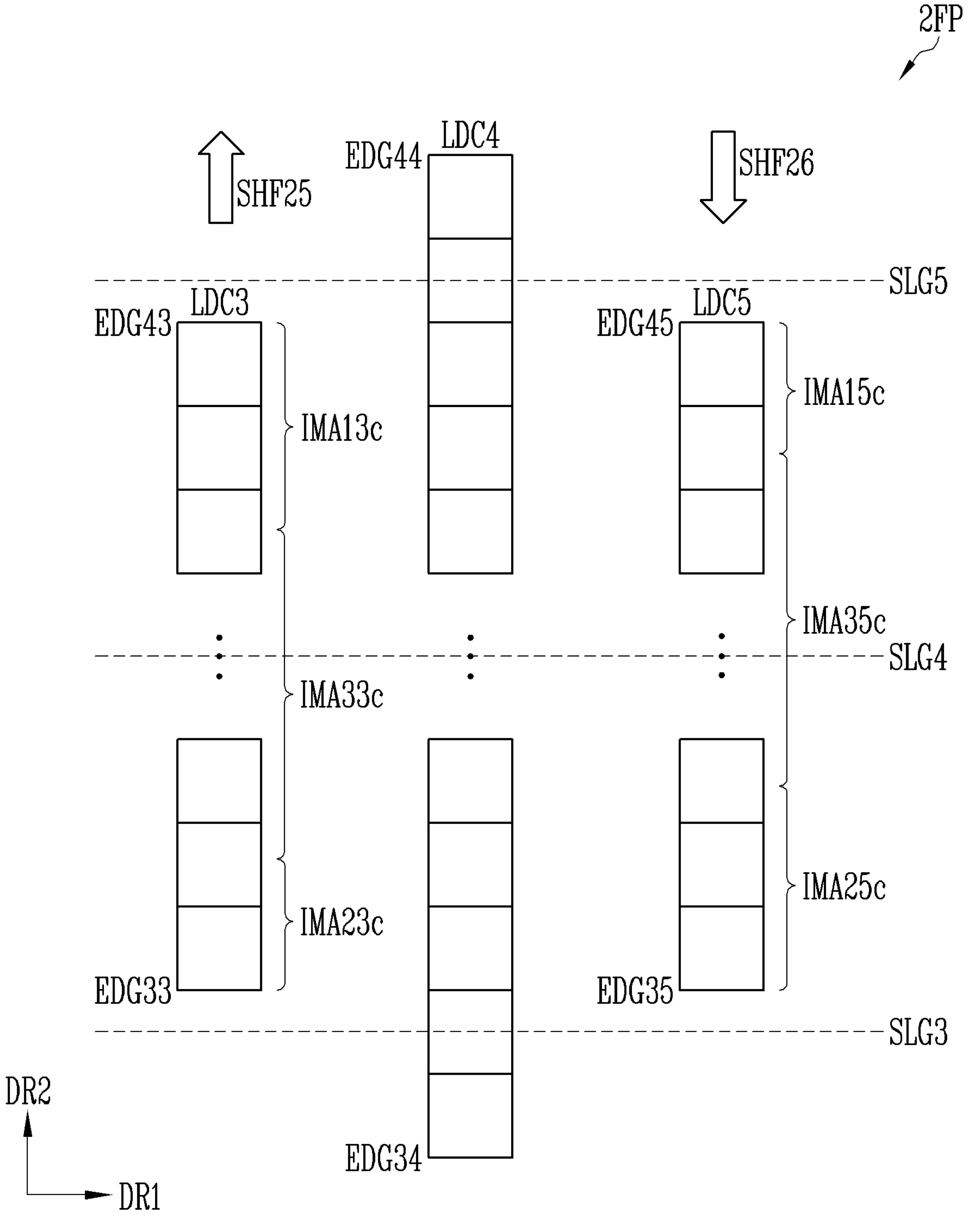
Figure 21:
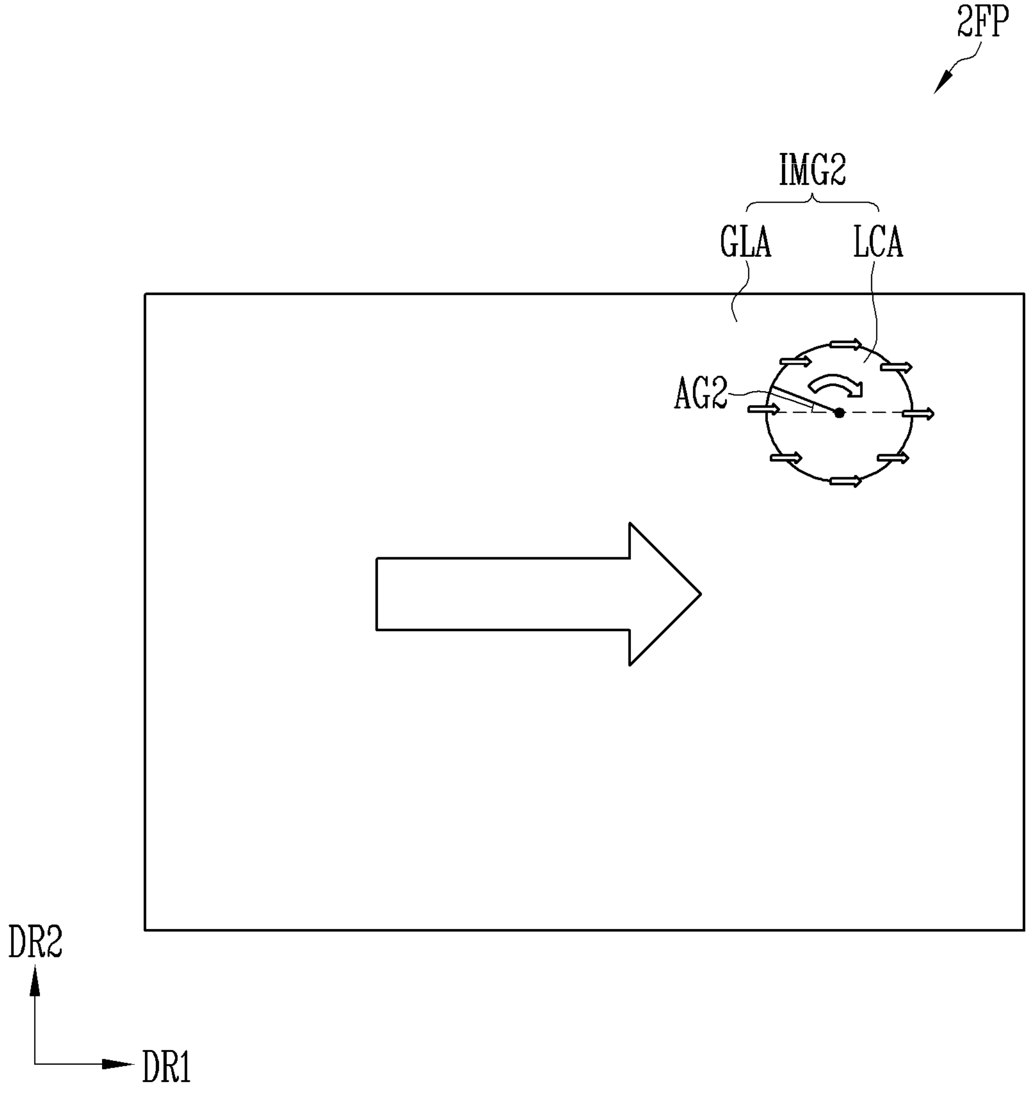

Referring to FIGS. 19 and 20, in the second frame period 2FP, first and second shift commands SHF23, SHF24, SHF25, and SHF26 in directions respectively opposite to those shown in FIGS. 15 and 17 may be provided. As a result, referring to FIG. 21, in the third image IMG3, a portion of the internal area of the second image area LCA may be rotated clockwise in the second frame period 2FP. However, when a rotation angle AG2 is excessively large, the rotation of the second image area LCA may be viewed by a user, and therefore, a maximum value of the rotation angle AG2 may be set or predetermined in a range where the rotation of the second image area LCA is not viewed by the user. For example, the maximum value of the rotation angle AG1 may be determined as (−)2 degrees, and the maximum value of the rotation angle AG2 may be determined as (+)2 degrees. Accordingly, the second image area LCA may be alternately shifted clockwise and counterclockwise within a rotation angle range.

When the second image area LCA is excessively small, a shift amount of the second image area LCA may not be sufficiently secured through only linear shift in the first direction DR1 or the second direction DR2. However, according to some example embodiments, a sufficient shift amount can be secured even when the second image area LCA is small, and it is necessary to limit the rotation angles AG1 and AG2 so as to prevent excessive shift.

The central portion of the second image area LCA hardly has any shift amount due to rotation, but a shift amount may be compensated by shift of the first image area GLA.

In accordance with the embodiments shown in FIGS. 14 to 21, the embodiments shown in FIGS. 14 to 21 are configured differently from the embodiments shown in FIGS. 12 and 13, in that an image portion displayed by fifth pixels PX5 connected to the second data lines DLG2 is shifted in the first direction DR1 in the second frame period 2FP (see FIG. 19).

FIGS. 22 to 30 are diagrams illustrating a pixel shift method according to some example embodiments of the present disclosure.

Figure 22:
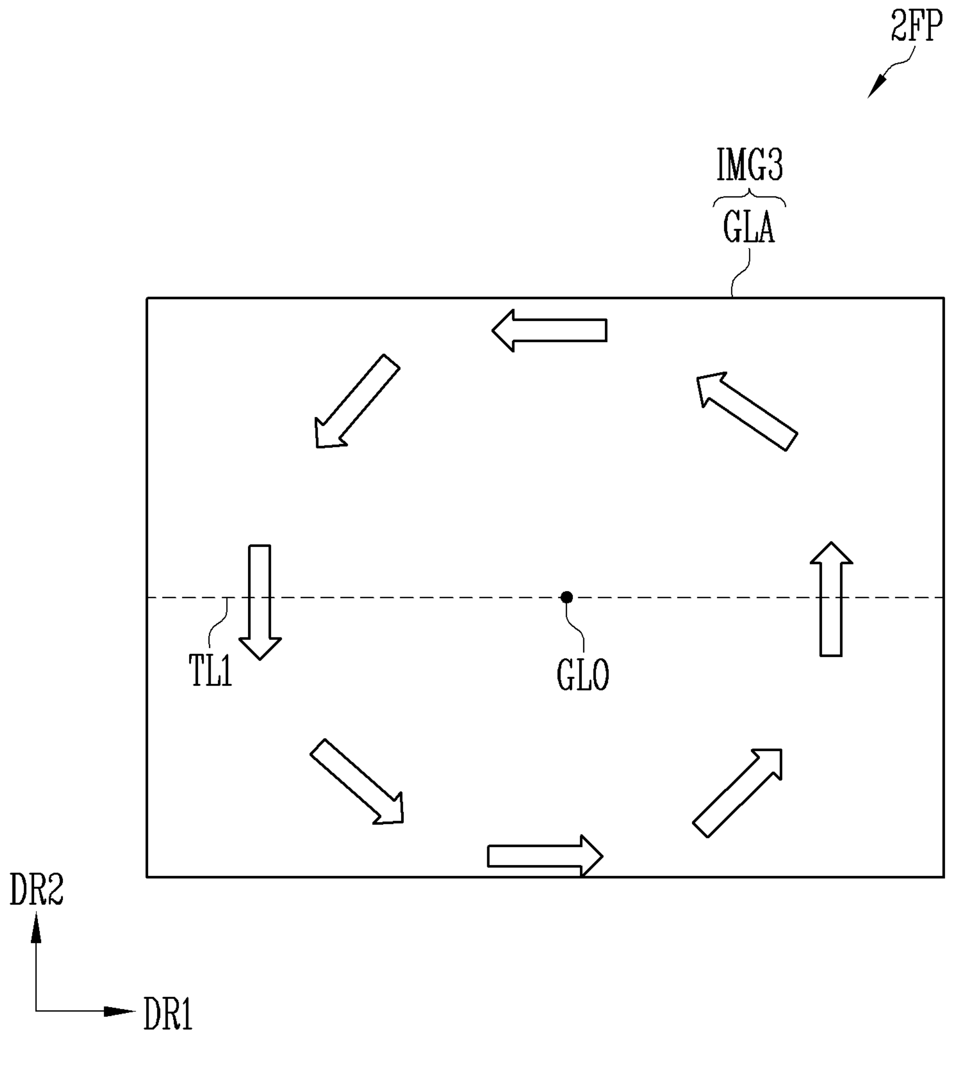
FIGS. 22 to 30 are diagrams illustrating a pixel shift method according to some example embodiments of the present disclosure.

Referring to FIG. 22, a case where a third image IMG3 is configured with only a first image area GLA is illustrated. The first image area GLA may be alternately shifted counterclockwise and clockwise with respect to a central point GLO.

Figure 23:
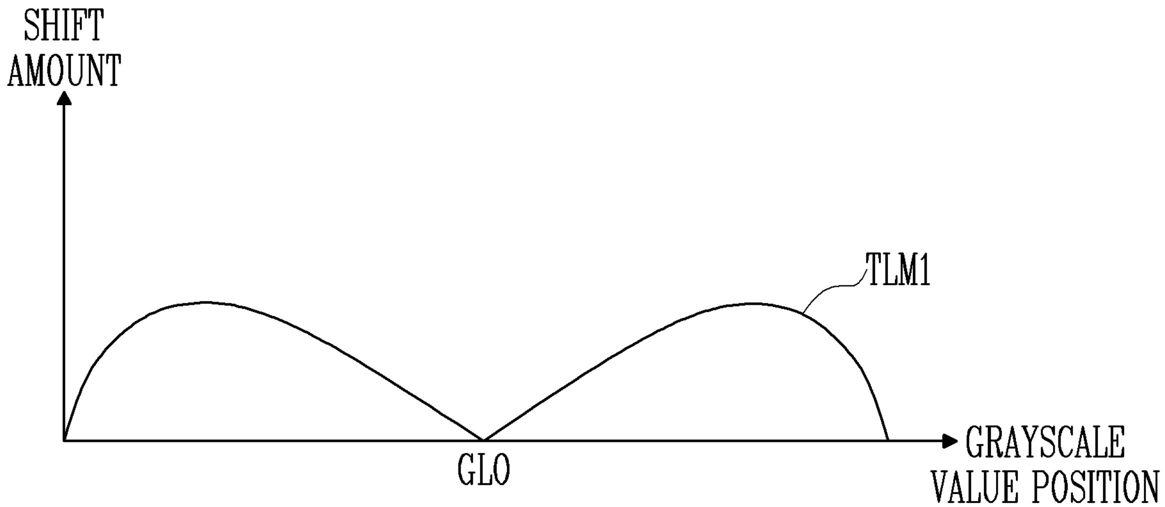

Referring to FIG. 23, shift amount of grayscale value position with respect to an arbitrary line TL1 of the third image IMG3 is illustrated as a graph TLM1. Referring to the graph TLM1, it can be seen that shift amounts in the vicinity of the central point GLO and in the vicinity of edges corresponding to a first window area and a second window area are insufficient.

Figure 24:
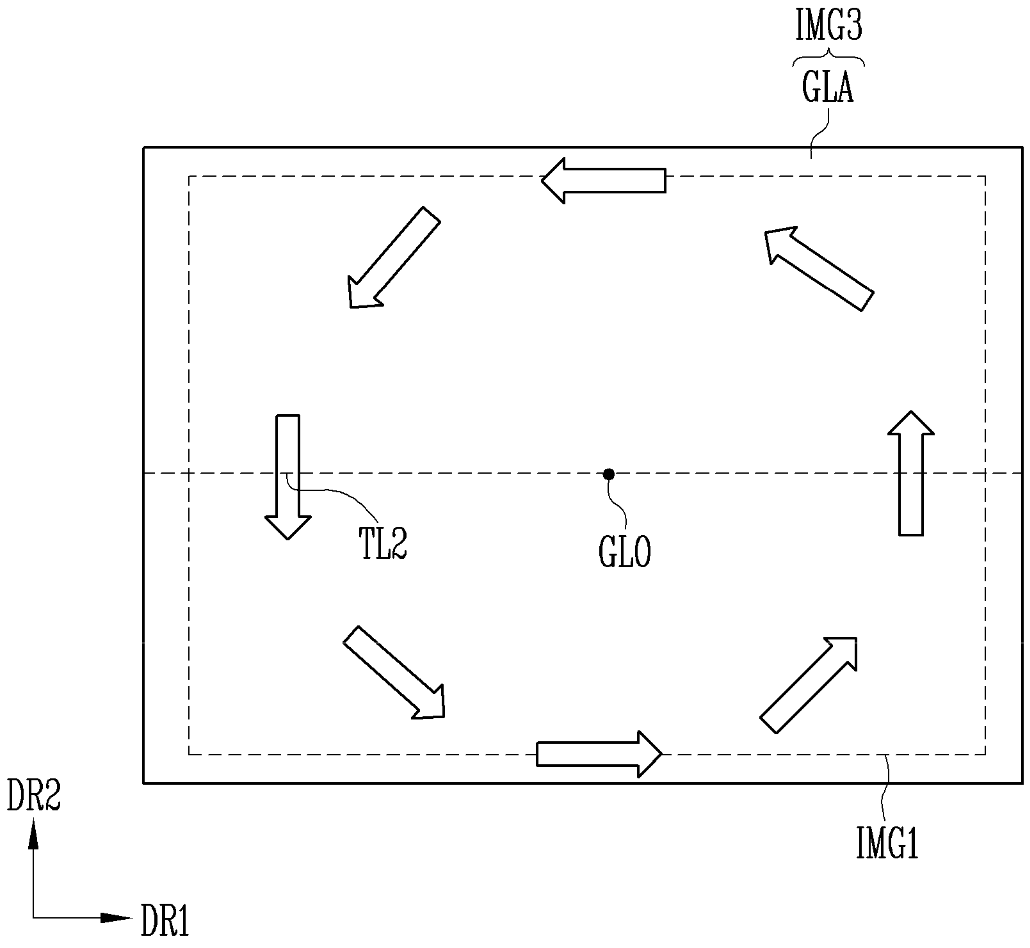
Figure 25:
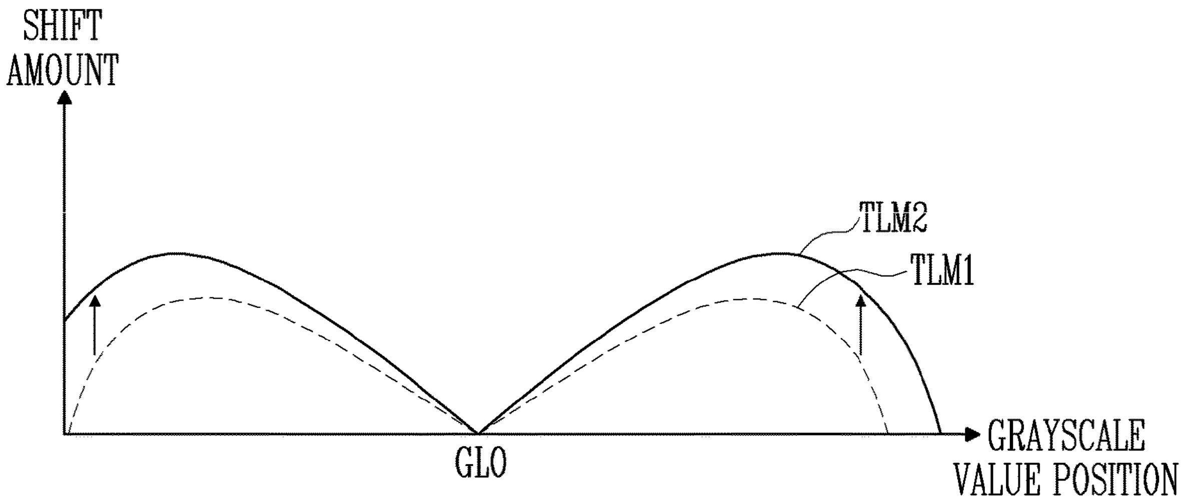

Referring to FIG. 24, before the pixel shift method is applied, a first image IMG1 may be enlarged to have grayscale values of which number is greater than that of all the pixels of the pixel unit 15. That is, when the first image IMG1 is alternately rotated clockwise or counterclockwise after the first image IMG1 is first enlarged, the ratio of a portion corresponding to the first window area and the second window area is relatively decreased, and thus insufficient shift amounts in the vicinity of the edges can be compensated. This refers to a graph TLM2 shown in FIG. 25.

Figure 26:
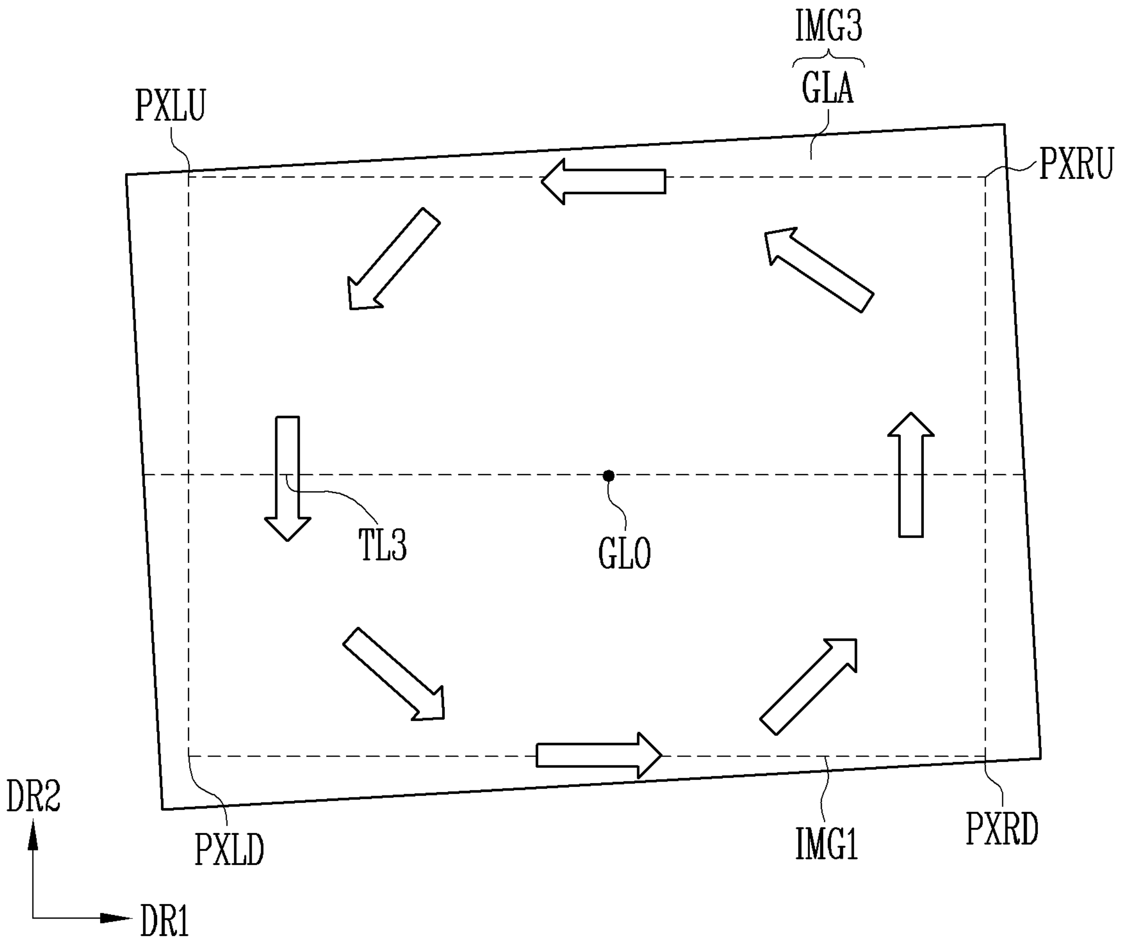
Figure 27:
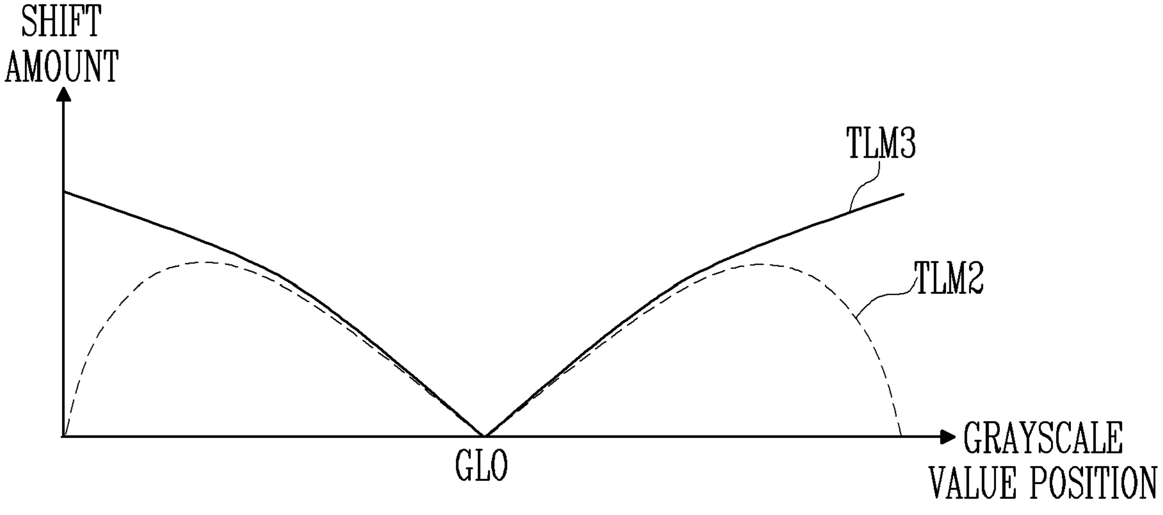

Referring to FIG. 26, a case where the first image IMG1 is alternately rotated clockwise or counterclockwise without setting first to third window areas in the enlarged first image IMG1. Thus, the shift amounts in the vicinity of the edges can be compensated as shown in a graph TLM3 shown in FIG. 27. However, pixels which do not cover the third image IMG3 may exist according to a rotation angle. In particular, the probability that the third image IMG3 will not cover pixels PXLU, PXRU, PXLD, and PXRD located corners among all the pixels is highest. Therefore, in a first frame period 1FP and a second frame period 2FP, the rotation angle of the third image IMG3 may be limited to a range where all the pixels display a portion of the rotated third image IMG3. For example, in the first frame period 1FP and the second frame period 2FP, the rotation angle of the third image IMG3 may be limited such that the pixels PXLU, PXRU, PXLD, and PXRD display a portion of the rotated third image IMG3.

Figure 28:
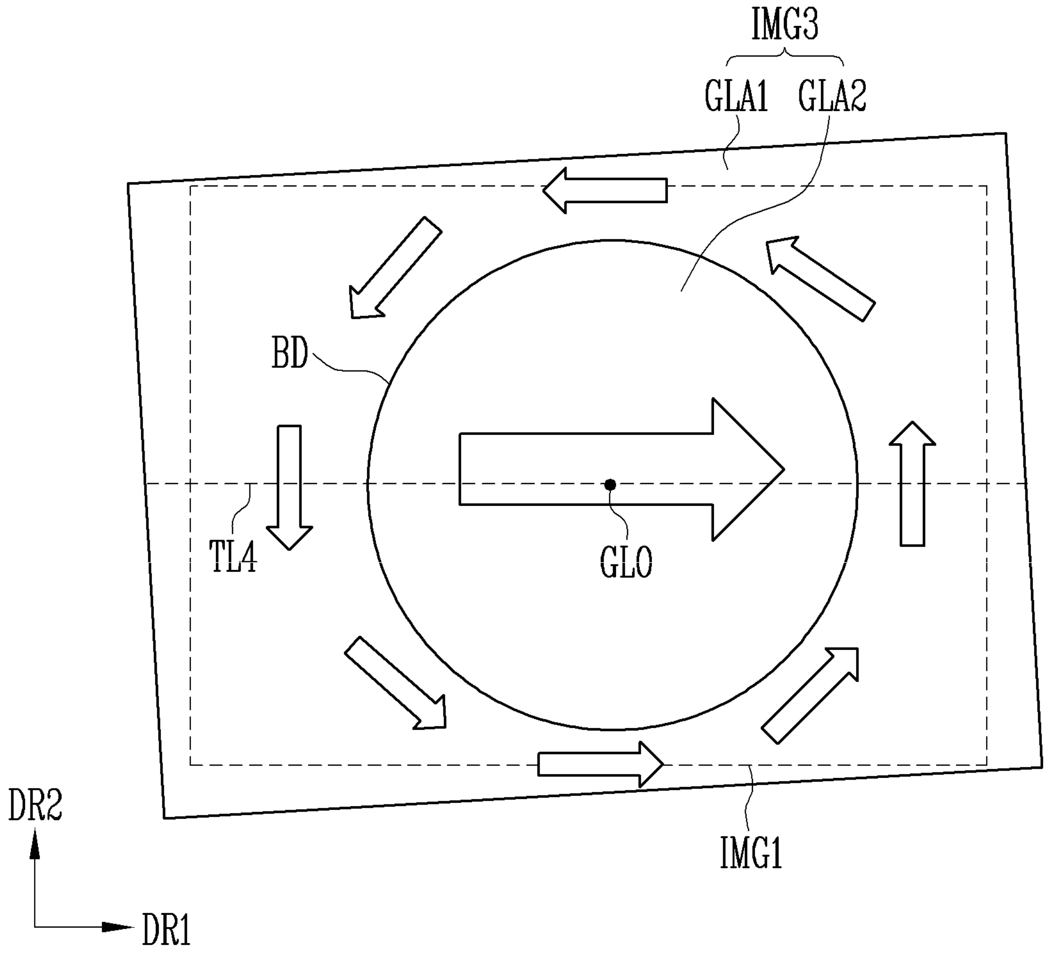

Referring to FIG. 28, in the first frame period 1FP or the second frame period 2FP, a second image area GLA2 surrounded by the first image area GLA1 may be further shifted in a first direction DR1. The first direction DR1 may be a direction different from the clockwise direction and the counterclockwise direction.

Figure 29:
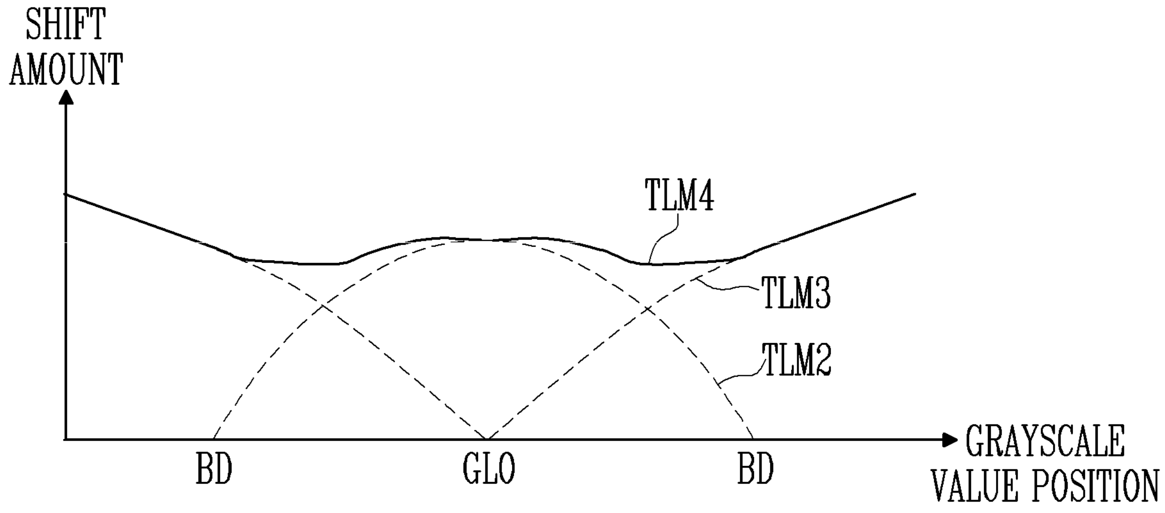

Referring to FIG. 29, it can be seen through a graph TLM4 that the shift amount of the central point is remarkably increased by a shift amount TLMA added when the second image area GLA2 is shifted.

Figure 30:
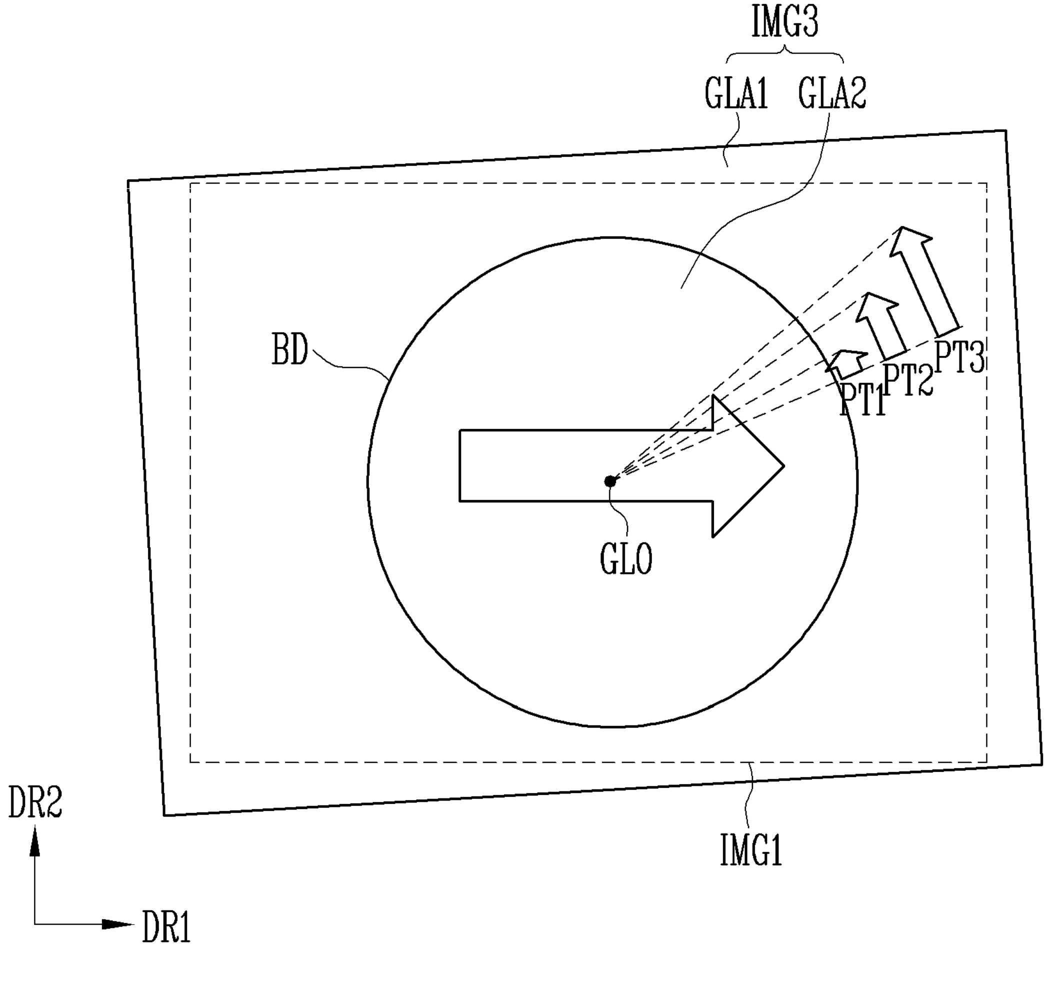

Referring to FIG. 30, in the first frame period 1FP or the second frame period 2FP, a rotation angle (or angular speed) of the first image area GLA1 may become greater as farther from a boundary BD of the first image area GLA1 and the second image area GLA2. That is, a rotation angle of a second point PT2 distant from the boundary BD may be greater than a rotation angle of a first point PT1 close to the boundary BD. In addition, a rotation angle of a third point PT3 may be greater than that of the second point PT2.

Accordingly, excessive rotation in the vicinity of the boundary BD may be prevented or reduced, so that the boundary BD can be prevented or reduced from being viewed or perceived by eyes of a user. Further, shift amounts in the vicinity of the edges of the third image IMG3 can be sufficiently secured.

In the display device and the driving method thereof in accordance with the present disclosure, a shift amount of a target image area may be partially increased, so that a pixel shift effect can be enhanced.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Aspects of some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A display device comprising:

a plurality of pixels configured to display an image in a first image area and a second image area surrounded by the first image area in a first frame period, wherein, in a second frame period after the first frame period, the first image area is shifted in a first direction and an internal area of the second image area is rotated clockwise during the second frame period, wherein, in a third frame period after the second frame period, the first image area is shifted in the first direction and the internal area of the second image area is rotated counterclockwise during the third frame period, and wherein the internal area of the second image area is alternately rotated in the clockwise direction and the counterclockwise direction in a first cycle shorter than a second cycle of changing a shift direction of the first image area.

2. The display device of claim 1, wherein an edge of the second image area is shifted in the first direction, in the second frame period.

3. A method for driving a display device, the method comprising:

displaying an image in a first image area and a second image area surrounded by the first image area in a first frame period;

shifting the first image area in a first direction and rotating an internal area of the second image area clockwise both during a second frame period after the first frame period; and shifting the first image area in the first direction and rotating the internal area of the second image area counterclockwise both during a third frame period after the second frame period, wherein the internal area of the second image area is alternately rotated in the clockwise direction and the counterclockwise direction in a first cycle shorter than a second cycle of changing a shift direction of the first image area.

4. The method of claim 3, wherein the second image area has an edge provided in one of an elliptical shape and a circular shape.

5. The method of claim 4, wherein a position of the edge in the first frame period and a position of the edge in the second frame period are different from each other.

6. The method of claim 5, wherein the position of the edge in the second frame period is located in the first direction from the position of the edge in the first frame period.

7. A method for driving a display device, the method comprising:

enlarging an image from a first number of grayscale values to a second number of grayscale values, such that the second number of grayscale values of the image is greater than the first number of grayscale values and is also greater than a number of all pixels of the display device to generate an enlarged image;

rotating a first image area of the enlarged image clockwise and displaying the first image area of the enlarged image after the first image area is rotated clockwise, in a first frame period; and rotating the first image area of the enlarged image counterclockwise and displaying the first image area of the enlarged image after the first image area is rotated counterclockwise, in a second frame period next to the first frame period.

8. The method of claim 7, wherein, in the first frame period and the second frame period, a rotation angle of the first image area is limited to a range where an entirety of the first image area is displayed after the first image area is rotated clockwise or counterclockwise.

9. The method of claim 8, wherein, in the first frame period and the second frame period, pixels located at corners among all the pixels display a portion of the first image area after the first image area is rotate clockwise or counterclockwise.

10. The method of claim 7, further comprising shifting a second image area surrounded by the first image area in a first direction, in the first frame period or the second frame period, wherein the first direction is a direction different from a clockwise direction and a counterclockwise direction.

11. The method of claim 10, wherein, in the first frame period and the second frame period, a rotation angle of the first image area becomes greater further from a boundary of the first image area and the second image area.

* * * * *